(12) United States Patent
Michalowski et al.

(10) Patent No.: US 8,484,051 B2
(45) Date of Patent: Jul. 9, 2013

(54) SYSTEM AND METHOD FOR USE IN CONNECTION WITH AN ANNUITY

(75) Inventors: Philip W. Michalowski, Glastonbury, CT (US); Keith E. Golembiewski, Suffield, CT (US); Joseph M. Weiss, Glastonbury, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 963 days.

(21) Appl. No.: 12/123,549

(22) Filed: May 20, 2008

(65) Prior Publication Data
US 2009/0292653 A1 Nov. 26, 2009

(51) Int. Cl.
G06Q 40/00 (2012.01)
G06Q 40/08 (2012.01)
G06Q 50/22 (2012.01)

(52) U.S. Cl.
CPC ............... G06Q 40/08 (2013.01); G06Q 50/22 (2013.01); G06Q 40/00 (2013.01)
USPC .......................................................... 705/4

(58) Field of Classification Search
CPC .......... G06Q 40/08; G06Q 50/22; G06Q 40/00
USPC .......................................................... 705/4
See application file for complete search history.

(56) References Cited

U.S. PATENT DOCUMENTS

| | | | |
|---|---|---|---|
| 5,754,980 A | 5/1998 | Anderson et al. | |
| 5,842,185 A * | 11/1998 | Chancey et al. | 705/40 |
| 5,878,405 A | 3/1999 | Grant et al. | |
| 5,893,071 A | 4/1999 | Cooperstein | |
| 5,913,198 A | 6/1999 | Banks | |
| 5,926,800 A | 7/1999 | Baronowski et al. | |
| 5,933,815 A | 8/1999 | Golden | |
| 6,012,048 A * | 1/2000 | Gustin et al. | 705/39 |
| 6,611,808 B1 | 8/2003 | Preti et al. | |
| 6,611,815 B1 | 8/2003 | Lewis et al. | |
| 6,868,358 B2 * | 3/2005 | Brown, Jr. | 702/138 |
| 7,016,871 B1 | 3/2006 | Fisher et al. | |
| 7,089,201 B1 | 8/2006 | Dellinger et al. | |
| 7,113,913 B1 | 9/2006 | Davis et al. | |
| 7,124,088 B2 | 10/2006 | Bauer et al. | |
| 7,484,508 B2 * | 2/2009 | Younes | 128/204.18 |
| 2001/0014873 A1 | 8/2001 | Henderson et al. | |

(Continued)

OTHER PUBLICATIONS

Unknown, Consumer Price Index (CPI) Calculator, Aug. 10, 2004, Way Back Machine, 1-3.*

(Continued)

*Primary Examiner* — Ella Colbert
*Assistant Examiner* — Scott S Trotter
(74) *Attorney, Agent, or Firm* — Howard IP Law Group, PC

(57) ABSTRACT

A method for determining one or more features of an annuity includes receiving data indicative of a prospective annuitant's personal expenses in at least a first expense category and a second expense category; storing the data in memory; accessing price index information for the first expense category; accessing price index information for the second expense category; accessing general price index information; and based on factors including the price index information for the first expense category, the price index information for the second expense category, and the general price index information, determining a benefit increase rate of an annuity for the prospective annuitant; and providing an output indicative of at least the determined benefit increase rate.

49 Claims, 17 Drawing Sheets

U.S. PATENT DOCUMENTS

| | | | |
|---|---|---|---|
| 2001/0047325 A1 | 11/2001 | Livingston | |
| 2002/0007330 A1 | 1/2002 | Kumar et al. | |
| 2002/0032650 A1* | 3/2002 | Hauser et al. | 705/40 |
| 2002/0035527 A1 | 3/2002 | Corrin | |
| 2002/0174045 A1 | 11/2002 | Arena et al. | |
| 2003/0088430 A1 | 5/2003 | Ruark | |
| 2003/0105652 A1 | 6/2003 | Arena et al. | |
| 2003/0120570 A1 | 6/2003 | Dellinger et al. | |
| 2003/0163402 A1 | 8/2003 | Kincart | |
| 2003/0191703 A1 | 10/2003 | Chen et al. | |
| 2004/0039608 A1 | 2/2004 | Mazur et al. | |
| 2004/0088236 A1 | 5/2004 | Manning | |
| 2004/0172350 A1 | 9/2004 | Atkinson et al. | |
| 2004/0181436 A1 | 9/2004 | Lange | |
| 2004/0204951 A1 | 10/2004 | Wood et al. | |
| 2004/0267647 A1 | 12/2004 | Brisbois | |
| 2005/0010510 A1 | 1/2005 | Brose et al. | |
| 2005/0080698 A1 | 4/2005 | Perg et al. | |
| 2005/0144103 A1 | 6/2005 | Perg et al. | |
| 2005/0234821 A1* | 10/2005 | Benham et al. | 705/40 |
| 2006/0074787 A1 | 4/2006 | Perg et al. | |
| 2006/0080148 A1 | 4/2006 | Koresko | |
| 2006/0089892 A1 | 4/2006 | Sullivan et al. | |
| 2006/0111998 A1 | 5/2006 | Fisher et al. | |
| 2006/0143055 A1 | 6/2006 | Loy et al. | |
| 2006/0149651 A1 | 7/2006 | Robinson | |
| 2006/0190373 A1 | 8/2006 | Perg et al. | |
| 2006/0206398 A1 | 9/2006 | Coughlin | |
| 2006/0206401 A1 | 9/2006 | Abbs et al. | |
| 2006/0212379 A1 | 9/2006 | Perg et al. | |
| 2006/0212380 A1 | 9/2006 | Williams et al. | |
| 2007/0011063 A1 | 1/2007 | Shelon et al. | |
| 2007/0011069 A1 | 1/2007 | Bevacqua, Jr. | |
| 2007/0011086 A1 | 1/2007 | Dellinger et al. | |
| 2007/0021986 A1 | 1/2007 | Cheung et al. | |
| 2007/0038488 A1 | 2/2007 | Bauer et al. | |
| 2007/0078690 A1 | 4/2007 | Kohl | |
| 2007/0100715 A1 | 5/2007 | O'Donnell et al. | |
| 2007/0100720 A1 | 5/2007 | Bonvouloir | |
| 2007/0100727 A1 | 5/2007 | Multer et al. | |
| 2007/0106589 A1 | 5/2007 | Schirripa | |
| 2007/0156559 A1 | 7/2007 | Wolzenski et al. | |
| 2007/0162380 A1 | 7/2007 | Conroy | |
| 2007/0198352 A1 | 8/2007 | Kannegiesser | |
| 2007/0198377 A1 | 8/2007 | Livingston et al. | |
| 2007/0239572 A1 | 10/2007 | Harris et al. | |
| 2007/0244777 A1 | 10/2007 | Torre et al. | |
| 2007/0271201 A1 | 11/2007 | Armand et al. | |
| 2007/0278288 A1 | 12/2007 | Simmons | |
| 2007/0288399 A1* | 12/2007 | Reynolds et al. | 705/36 R |
| 2008/0046382 A1* | 2/2008 | Metz | 705/36 R |
| 2008/0114703 A1 | 5/2008 | Dahlberg et al. | |

OTHER PUBLICATIONS

International Search Report dated Mar. 19, 2009.
Prospectus, Penn Mutual Variable Annuity Account III, Enhanced Credit Variable Annuity; May 1, 2007.
"Glossary of Insurance Terms", Insurance Information Institute, http:www.iii.org/media/glossary (Jan. 1, 2008).
Penn Mutual Variable Annuity Account III, SEC Form 497, Filed Oct. 2, 2006.
New York Life Longevity Benefit Variable Annuity Brochure, New York Life Insurance Company, May 2007.
New York Life Longevity Benefit Variable Annuity FactSheet, New York Life Insurance Company, May 2007.
Paradis, T., More Funds Adopt Performance-Based Fees, Washingtonpost.com (Associated Press), Apr. 8, 2007.
"Facts about the New York Life Longevity Benefit Variable Annuity Product", New York Life Insurance Company, May 2007.
New York Life Longevity Benefit Variable Annuity Prospectus Amendment dated Aug. 15, 2007, New York Life Insurance Company, Aug. 2007.
S&P U.S. Indices Index Methodology, Standard & Poor's, Sep. 2007.
Blodget, H., Money for Nothing: The Real Trouble with Mutual Funds, Slate.com, Dec. 1, 2004.
"Income Select for Life"; Transamerica Financial Life Insurance Company; https://www.transamericaadvisor.com/contentServer/MediaServer? uri=/site/tciidex/media/PDF/Annuities _TCl/Client _ Approved_Material/Tips_and_Techniques/BRIS.pdf.
"Jackson Enhances Living Benefit Options within its Perspective Family of Variable Annuities"; Business Wire; Apr. 30, 2007.
"Learn the Basics about Lifetime Legacy"; http://www.americo.com/lifetirne/lifetimelegacy.html; Accessed Jan. 4, 2008.
"Accelerated Death Benefits"; http://www.medicare.gov/; Accessed Jan. 4, 2008.
"Alternatives to Long Term Care Insurance (LTCi)"; Senior Wealth Protection Advocates; http://www.senior-wealth-protection-advocates.com/long-term-care-insurancealternatives.html; Site Accessed Jan. 4, 2008.
Form N-4, Transamerica Life Insurance Company; Separate Account VA B; filed Apr. 26, 2006.
Form N-4, Transamerica Life Insurance Company; Flexible Premium Variable Annuity-J; Separate Account VA Y; filed Feb. 22, 2006.
"Fidelity.com Glossary" (letter "p"); https://scs.fidelity.com/webxpress/help/topics/help_definition_p.shtml; Accessed Jan. 4, 2008.
Stout, R.G. et al.; "Dynamic Retirement Withdrawal Planning"; Financial Services Review 15 (2006) 117-131.
"Prudential Investments Introduces Strategic Partners Annuity One; New Variable Annuity Offers Investors World-Class Money Managers and Flexible Product Features"; Business Wire, Oct. 9, 2000.
"Retireonyourterms"; http://www.retireonyourterms.com/ glossary/GlossaryText.htm; Accessed Jan. 4, 2008.
Buckingham, B.; "Making IRAs Last a Lifetime with Annuities"; Life & Health Advisor; Mar. 2006.
"RiverSource Innovations Select Variable Annuity"; http://www.riversource.com/rvsc/global/docs/INNOV-SELECT-NY-AAG.pdf.
"Pacific Life Individual (k) Program"; https://annuities.myaccount.pacificlife.com/public/corporate/product_info/pos/guide pos_1911-07b.pdf.
"Just the Facts: The Best of America All American Gold Annuity Key Facts"; Nationwide Financial Services, Inc.; https://ssc.nwseivicecenter.com/media/pdf/product/VAM-0504AO-FLpdf.
Key to Making Retirement Savings last: The Withdrawal Rate, New York Life, www.newyorklife.com/cda/0,3254,14198,00.html. (accessed May 22, 2008).

* cited by examiner

How much do you typically spend in a month in each of the following categories? 500

510 — 515

520 — HEALTH CARE

525 — ENTERTAINMENT

530 — HOUSING

535 — TRANSPORTATION

540 — TRAVEL

545 — FOOD

550 — UTILITIES

555 — CLOTHING

560 — CHARITY

*FIG. 5*

How does your spending compare to the typical spending of someone of roughly your age and income in each of the following categories?

|  | LESS | SAME | MORE |
|---|---|---|---|
| HEALTH CARE | | —┼— | |
| ENTERTAINMENT | | —┼— | |
| HOUSING | | —┼— | |
| TRANSPORTATION | | —┼— | |
| TRAVEL | | —┼— | |
| FOOD | | —┼— | |
| UTILITIES | | —┼— | |
| CLOTHING | | —┼— | |
| CHARITY | | —┼— | |

*FIG. 6*

| Client Age | AV | LBP Available | Guaranteed Minimum LBP w/Inflation | Return | Ending AV |
|---|---|---|---|---|---|
| 65 | $100,000 | $5,000 | $5,000 | $7,000 | $107,000 |
| 66 | $107,000 | $5,350 | $5,200 | $7,490 | $114,490 |
| 67 | $114,490 | $5,725 | $5,408 | $8,014 | $122,504 |
| 68 | $122,504 | $6,125 | $5,624 | $8,575 | $131,080 |
| 69 | $131,080 | $6,554 | $5,849 | $9,176 | $140,255 |
| 70 | $140,255 | $7,013 | $6,083 | $9,818 | $150,073 |
| 71 | $150,073 | $7.504 | $6,327 | $10,505 | $160,578 |
| 72 | $160,578 | $8,029 | $6,580 | $11,240 | $171,819 |
| 73 | $171,819 | $8,591 | $6,843 | $12,027 | $183,846 |
| 74 | $183,846 | $9,192 | $7,117 | $12,869 | $196,715 |
| 75 | $196,715 | $9,836 | $7,401 | $13,770 | $210,485 |
| 76 | $210,485 | $10,524 | $7,697 | $14,734 | $225,219 |
| 77 | $225,219 | $11,261 | $8,005 | $15,765 | $240,985 |
| 78 | $240,985 | $12,049 | $8,325 | $16,869 | $257,853 |
| 79 | $257,853 | $12,893 | $8,658 | $18,050 | $275,903 |
| 80 | $275,903 | $13,795 | $9,005 | $19,313 | $295,216 |
| 81 | $295,216 | $14,761 | $9,365 | $20,665 | $315,882 |
| 82 | $315,882 | $15,794 | $9,740 | $22,112 | $337,993 |
| 83 | $337,993 | $16,900 | $10,129 | $23,660 | $361,653 |
| 84 | $361,653 | $18,083 | $10,534 | $25,316 | $386,968 |
| 85 | $386,968 | $19,348 | $10,956 | $27,088 | $414,056 |
| 86 | $414,056 | $20,703 | $11,394 | $28,984 | $443,040 |
| 87 | $443,040 | $22,152 | $11,850 | $31,013 | $474,053 |
| 88 | $474,053 | $23,703 | $12,324 | $33,184 | $507,237 |
| 89 | $507,237 | $25,362 | $12,817 | $35,507 | $542,743 |
| 90 | $542,743 | $27,137 | $13,329 | $37,992 | $580,735 |

*FIG. 10A*

| Client Age | AV | LBP Available | Guaranteed Minimum LBP w/Inflation | Return | Ending AV |
|---|---|---|---|---|---|
| 65 | $100,000 | $5,000 | $5,000 | $0 | $100,000 |
| 66 | $100,000 | $5,200 | $5,200 | $0 | $100,000 |
| 67 | $100,000 | $5,408 | $5,408 | $0 | $100,000 |
| 68 | $100,000 | $5,624 | $5,624 | $0 | $100,000 |
| 69 | $100,000 | $5,849 | $5,849 | $0 | $100,000 |
| 70 | $100,000 | $6,083 | $6,083 | $0 | $100,000 |
| 71 | $100,000 | $6,327 | $6,327 | $0 | $100,000 |
| 72 | $100,000 | $6,580 | $6,580 | $0 | $100,000 |
| 73 | $100,000 | $6,843 | $6,843 | $0 | $100,000 |
| 74 | $100,000 | $7,117 | $7,117 | $0 | $100,000 |
| 75 | $100,000 | $7,401 | $7,401 | $0 | $100,000 |
| 76 | $100,000 | $7,697 | $7,697 | $0 | $100,000 |
| 77 | $100,000 | $8,005 | $8,005 | $0 | $100,000 |
| 78 | $100,000 | $8,325 | $8,325 | $0 | $100,000 |
| 79 | $100,000 | $8,658 | $8,658 | $0 | $100,000 |
| 80 | $100,000 | $9,005 | $9,005 | $0 | $100,000 |
| 81 | $100,000 | $9,365 | $9,365 | $0 | $100,000 |
| 82 | $100,000 | $9,740 | $9,740 | $0 | $100,000 |
| 83 | $100,000 | $10,129 | $10,129 | $0 | $100,000 |
| 84 | $100,000 | $10,534 | $10,534 | $0 | $100,000 |
| 85 | $100,000 | $10,956 | $10,956 | $0 | $100,000 |
| 86 | $100,000 | $11,394 | $11,394 | $0 | $100,000 |
| 87 | $100,000 | $11,850 | $11,850 | $0 | $100,000 |
| 88 | $100,000 | $12,324 | $12,324 | $0 | $100,000 |
| 89 | $100,000 | $12,817 | $12,817 | $0 | $100,000 |
| 90 | $100,000 | $13,329 | $13,329 | $0 | $100,000 |

FIG. 10B

| Client Age | AV | LBP Available | Guaranteed Minimum LBP w/Inflation | Return | Withdrawal | Ending AV |
|---|---|---|---|---|---|---|
| 65 | $100,000 | $5,000 | $5,000 | $3,000 | $0 | $103,000 |
| 66 | $103,000 | $5,200 | $5,200 | $3,090 | $0 | $106,090 |
| 67 | $106,090 | $5,408 | $5,408 | $3,183 | $0 | $109,273 |
| 68 | $109,273 | $5,624 | $5,624 | $3,278 | $0 | $112,551 |
| 69 | $112,551 | $5,849 | $5,849 | $3,377 | $0 | $115,927 |
| 70 | $115,927 | $6,083 | $6,083 | $3,478 | $6,083 | $113,322 |
| 71 | $113,322 | $6,327 | $6,327 | $3,400 | $6,327 | $110,395 |
| 72 | $110,395 | $6,580 | $6,580 | $3,312 | $6,580 | $107,127 |
| 73 | $107,127 | $6,843 | $6,843 | $3,214 | $6,843 | $103,498 |
| 74 | $103,498 | $7,117 | $7,117 | $3,105 | $7,117 | $99,487 |
| 75 | $99,487 | $7,401 | $7,401 | $2,985 | $7,401 | $95,070 |
| 76 | $95,070 | $7,697 | $7,697 | $2,852 | $7,697 | $90,225 |
| 77 | $90,225 | $8,005 | $8,005 | $2,707 | $8,005 | $84,926 |
| 78 | $84,926 | $8,325 | $8,325 | $2,548 | $8,325 | $79,149 |
| 79 | $79,149 | $8,658 | $8,658 | $2,374 | $8,658 | $72,865 |
| 80 | $72,865 | $9,005 | $9,005 | $2,186 | $9,005 | $66,046 |
| 81 | $66,046 | $9,365 | $9,365 | $1,981 | $9,365 | $58,663 |
| 82 | $58,663 | $9,740 | $9,740 | $1,760 | $9,740 | $50,683 |
| 83 | $50,683 | $10,129 | $10,129 | $1,520 | $10,129 | $42,074 |
| 84 | $42,074 | $10,534 | $10,534 | $1,262 | $10,534 | $32,802 |
| 85 | $32,802 | $10,956 | $10,958 | $984 | $10,956 | $22,831 |
| 86 | $22,831 | $11,394 | $11,394 | $685 | $11,394 | $12,122 |
| 87 | $12,122 | $11,850 | $11,850 | $364 | $11,850 | $636 |
| 88 | $636 | $12,324 | $12,324 | $19 | $12,324 | $0 |
| 89 | $0 | $12,817 | $12,817 | $0 | $12,817 | $0 |
| 90 | $0 | $13,329 | $13,329 | $0 | $13,329 | $0 |

*FIG. 10C*

| Client Age | AV | LBP Available | Personalized Inflation Rate | Guaranteed Minimum LBP w/Inflation | Return | Withdrawal | Ending AV |
|---|---|---|---|---|---|---|---|
| 65 | $100,000 | $5,000 | 3% | $5,000 | $5,000 | $0 | $105,000 |
| 66 | $105,000 | $5,250 | 3% | $5,150 | $5,250 | $0 | $110,250 |
| 67 | $110,250 | $5,513 | 3% | $5,305 | $5,513 | $0 | $115,763 |
| 68 | $115,763 | $5,788 | 4% | $5,517 | $5,788 | $0 | $121,551 |
| 69 | $121,551 | $6,078 | 4% | $5,737 | $6,078 | $0 | $127,628 |
| 70 | $127,628 | $6,381 | 4% | $5,967 | $6,381 | $6,381 | $127,628 |
| 71 | $127,628 | $6,381 | 4% | $6,206 | $6,381 | $6,381 | $127,628 |
| 72 | $127,628 | $6,381 | 2% | $6,330 | $6,381 | $6,381 | $127,628 |
| 73 | $127,628 | $6,456 | 2% | $6,456 | $6,381 | $6,456 | $127,553 |
| 74 | $127,553 | $6,585 | 2% | $6,585 | $6,378 | $6,585 | $127,346 |
| 75 | $127,346 | $6,717 | 2% | $6,717 | $6,367 | $6,717 | $126,996 |
| 76 | $126,996 | $6,851 | 2% | $6,851 | $6,350 | $6,851 | $126,494 |
| 77 | $126,494 | $6,988 | 2% | $6,988 | $6,325 | $6,988 | $125,831 |
| 78 | $125,831 | $7,128 | 2% | $7,128 | $6,292 | $7,128 | $124,994 |
| 79 | $124,994 | $7,271 | 2% | $7,271 | $6,250 | $7,271 | $123,973 |
| 80 | $123,973 | $7,707 | 6% | $7,707 | $6,199 | $7,707 | $122,465 |
| 81 | $122,465 | $8,169 | 6% | $8,169 | $6,123 | $8,169 | $120,418 |
| 82 | $120,418 | $8,660 | 6% | $8,660 | $6,021 | $8,660 | $117,780 |
| 83 | $117,780 | $9,179 | 6% | $9,179 | $5,889 | $9,179 | $114,490 |
| 84 | $114,490 | $9,730 | 6% | $9,730 | $5,724 | $9,730 | $110,484 |
| 85 | $110,484 | $10,314 | 6% | $10,314 | $5,524 | $10,314 | $105,695 |
| 86 | $105,695 | $10,933 | 6% | $10,933 | $5,285 | $10,933 | $100,047 |
| 87 | $100,047 | $11,588 | 6% | $11,588 | $5,002 | $11,588 | $93,461 |
| 88 | $93,461 | $12,284 | 6% | $12,284 | $4,673 | $12,284 | $85,850 |
| 89 | $85,850 | $13,021 | 6% | $13,021 | $4,292 | $13,021 | $77,122 |
| 90 | $77,122 | $13,802 | 6% | $13,802 | $3,856 | $13,802 | $67,176 |

FIG. 10D

Premium $100,000
Age 65
Net Returns 0%
Prior Art Income % for age 65 4%
For Hypo, CPI-U is 3% annually

| Year | Starting AV | Benefit Base | Available Income | Income Take | Inflation Rate | Ending AV |
|---|---|---|---|---|---|---|
| 65 | $100,000 | $100,000 | $4,000 | $4,000 | 3% | $96,000 |
| 66 | $96,000 | $103,000 | $4,120 | $4,120 | 3% | $91,880 |
| 67 | $91,880 | $106,090 | $4,244 | $4,244 | 3% | $87,636 |
| 68 | $87,636 | $109,273 | $4,371 | $4,371 | 3% | $83,265 |
| 69 | $83,265 | $112,551 | $4,502 | $4,502 | 3% | $78,763 |
| 70 | $78,763 | $115,927 | $4,637 | $4,637 | 3% | $74,126 |
| 71 | $74,126 | $119,405 | $4,776 | $4,776 | 3% | $69,350 |
| 72 | $69,350 | $122,987 | $4,919 | $4,919 | 3% | $64,431 |
| 73 | $64,431 | $126,677 | $5,067 | $5,067 | 3% | $59,364 |
| 74 | $59,364 | $130,477 | $5,219 | $5,219 | 3% | $54,144 |
| 75 | $54,144 | $134,392 | $5,376 | $5,376 | 3% | $48,769 |
| 76 | $48,769 | $138,423 | $5,537 | $5,537 | 3% | $43,232 |
| 77 | $43,232 | $142,576 | $5,703 | $5,703 | 3% | $37,529 |
| 78 | $37,529 | $146,853 | $5,874 | $5,874 | 3% | $31,655 |
| 79 | $31,655 | $151,259 | $6,050 | $6,050 | 3% | $25,604 |
| 80 | $25,604 | $155,797 | $6,232 | $6,232 | 3% | $19,372 |
| 81 | $19,372 | $160,471 | $6,419 | $6,419 | 3% | $12,954 |
| 82 | $12,954 | $165,285 | $6,611 | $6,611 | 3% | $6,342 |
| 83 | $6,342 | $170,243 | $6,810 | $6,810 | 3% | — |
| 84 | — | $175,351 | $7,014 | $7,014 | 3% | — |

FIG. 11B

Premium $100,000
Age 65
Net Returns 0%
Embodiment Income % for age 65 4%
For Hypo, Personalized Inflation Rate is 5% annually

| Year | Starting AV | Benefit Base | Available Income | Income Take | Inflation Rate | Ending AV |
|---|---|---|---|---|---|---|
| 65 | $100,000 | $100,000 | $4,000 | $4,000 | 5% | $96,000 |
| 66 | $96,000 | $105,000 | $4,200 | $4,200 | 5% | $91,800 |
| 67 | $91,800 | $110,250 | $4,410 | $4,410 | 5% | $87,390 |
| 68 | $87,390 | $115,763 | $4,631 | $4,631 | 5% | $82,760 |
| 69 | $82,760 | $121,551 | $4,862 | $4,862 | 5% | $77,897 |
| 70 | $77,897 | $127,628 | $5,105 | $5,105 | 5% | $72,792 |
| 71 | $72,792 | $134,010 | $5,360 | $5,360 | 5% | $67,432 |
| 72 | $67,432 | $140,710 | $5,628 | $5,628 | 5% | $61,804 |
| 73 | $61,804 | $147,746 | $5,910 | $5,910 | 5% | $55,894 |
| 74 | $55,894 | $155,133 | $6,205 | $6,205 | 5% | $49,688 |
| 75 | $49,688 | $162,889 | $6,516 | $6,516 | 5% | $43,173 |
| 76 | $43,173 | $171,034 | $6,841 | $6,841 | 5% | $36,331 |
| 77 | $36,331 | $179,586 | $7,183 | $7,183 | 5% | $29,148 |
| 78 | $29,148 | $188,565 | $7,543 | $7,543 | 5% | $21,605 |
| 79 | $21,605 | $197,993 | $7,920 | $7,920 | 5% | $13,686 |
| 80 | $13,686 | $207,893 | $8,316 | $8,316 | 5% | $5,370 |
| 81 | $5,370 | $218,287 | $8,731 | $8,713 | 5% | — |
| 82 | — | $229,202 | $9,168 | $9,168 | 5% | — |
| 83 | — | $240,662 | $9,626 | $9,626 | 5% | — |
| 84 | — | $252,695 | $10,108 | $10,108 | 3% | — |

FIG. 11C

SYSTEM AND METHOD FOR USE IN CONNECTION WITH AN ANNUITY

FIELD OF INVENTION

The present invention relates to computer systems, and particularly to computer systems for calculating features of financial products.

BACKGROUND

An annuity is a type of insurance service. In general terms, in an annuity contract, an insurance company and an annuitant contract for the annuitant to make one or more payments to the insurance company. For that consideration, the insurance company makes periodic payments to an annuitant. By way of example, the insurance company may be obliged to make a payment of a predetermined amount to the annuitant annually for a predetermined time period. In another example, the insurance company is obliged to make payments of a predetermined amount to the annuitant annually for the life of the annuitant.

An annuity contract in which the payments to the annuitant do not change over time results in a loss of purchase power over time, as a result of price inflation. In the prior art, an annuity product provides for an increase in the amount of payments associated with the Consumer Price Index for all urban consumers (CPI-U) compiled by the United States Department of Labor, an agency of the U.S. Federal government.

SUMMARY OF THE INVENTION

In an embodiment, a computer system for use in connection with preparation of an insurance contract, namely an annuity, includes a processor and a memory in communication with the processor. The processor is adapted to display queries on a user-accessible device; receive data via the user-accessible device indicative of the amounts of a prospective annuitant's personal expenses in at least a first expense category and a second expense category, the first and second expense categories being at least two of health care, entertainment, housing, transportation, travel, food and utilities; access stored price index information for the first expense category and the second expense category; access stored general consumer price index information; based on factors including at least the personal expense amounts in the first and second expense categories, price index information for the first expense category, the price index information for the second expense category, and the general price index information, determine a benefit increase rate of an annuity for the prospective annuitant; and display the determined benefit increase rate, wherein the determined benefit increase rate reflects an inflation rate applicable to the prospective annuitant's personal expenses more accurately than does the general consumer price index.

In one embodiment, a computer system for use in connection with an annuity includes a processor and a memory in communication with the processor, the processor adapted to: receive data indicative of a prospective annuitant's personal expenses in at least a first expense category and a second expense category; store the data in the memory; access digitally stored price index information for the first expense category; access digitally stored price index information for the second expense category; access digitally stored general price index information; and based on the price index information for the first expense category, the price index information for the second expense category, and the general price index information, determine a benefit increase rate of an annuity for the prospective annuitant; and provide an output digital signal indicative of at least the determined benefit increase rate.

In an embodiment, a computer implemented method for use in connection with an annuity includes receiving data indicative of a prospective annuitant's personal expenses in at least a first expense category and a second expense category; storing the data in memory; accessing via a processor price index information for the first expense category; accessing via the processor price index information for the second expense category; accessing via the processor general price index information; and based on the price index information for the first expense category, the price index information for the second expense category, and the general price index information, determining in the processor a benefit increase rate of an annuity for the prospective annuitant; and providing an output including data indicative of at least the determined benefit increase rate.

In an embodiment, a computer-readable medium has instructions thereon which, when executed by a processor, cause the processor to perform the steps of: receiving data indicative of a prospective annuitant's personal expenses in at least a first expense category and a second expense category; storing the data in memory; accessing digitally stored price index information for the first expense category; accessing digitally stored price index information for the second expense category; accessing digitally stored general price index information; and based on the price index information for the first expense category, the price index information for the second expense category, and the general price index information, determining a benefit increase rate of an annuity for the prospective annuitant; and providing an output digital signal indicative of at least the determined benefit increase rate.

In an embodiment, a system for administering an annuity includes a processor and a memory in communication with the processor; the processor being adapted to: receive data indicative of an annuitant's personal expenses in at least a first expense category and a second expense category; access digitally stored price index information for the first expense category; access digitally stored price index information for the second expense category; access digitally stored general price index information; and based on the price index information for the first expense category, the price index information for the second expense category, and the general price index information, determine a benefit increase rate of an annuity for the annuitant; receive a digital signal including an indication of an establishment of an annuity contract, wherein at least one feature of the annuity contract is the determined benefit increase rate; based on the benefit increase rate, determine a benefit amount for the annuitant; provide an output digital signal including a notification of the determined benefit amount; and if a digital signal is received including an instruction received from the annuitant to commence payment of the benefit amount in accordance with the benefit increase rate, provide one or more output digital signals including an instruction to pay the annuitant the determined benefit amount as a stream of payments increasing in accordance with the determined benefit increase rate.

In an embodiment, a computer-implemented method of administering an annuity contract includes receiving data indicative of an annuitant's personal expenses in at least a first expense category and a second expense category; accessing by a processor via a digital communication channel digitally stored price index information for the first expense category;

accessing by the processor via a digital communication channel digitally stored price index information for the second expense category; accessing by the processor via a digital communication channel digitally stored general price index information; and based on the price index information for the first expense category, the price index information for the second expense category, and the general price index information, determining by the processor a benefit increase rate of an annuity for the annuitant; receiving at the processor a digital signal including data indicative of an establishment of an annuity contract, wherein at least one feature of the annuity contract is the determined benefit increase rate; based on the benefit increase rate, determining by the processor a benefit amount for the annuitant; providing by the processor an output signal including a notification of the determined benefit amount; and, if a digital signal is received by the processor including an instruction from the annuitant to commence payment of the benefit amount in accordance with the benefit increase rate, providing an output digital signal including an instruction for paying the annuitant the determined benefit amount as a stream of payments increasing in accordance with the determined benefit increase rate.

In an embodiment, a computer-readable medium has instructions thereon which, when executed by a processor, cause the processor to perform the steps of: receiving data indicative of an annuitant's personal expenses in at least a first expense category and a second expense category; accessing digitally stored price index information for the first expense category; accessing digitally stored price index information for the second expense category; accessing digitally stored general price index information; and based on the price index information for the first expense category, the price index information for the second expense category, and the general price index information, determining a benefit increase rate of an annuity for the annuitant; receiving a digital signal including data indicative of an establishment of an annuity contract, wherein at least one feature of the annuity contract is the determined benefit increase rate; based on the benefit increase rate, determining a benefit amount for the annuitant; providing an output digital signal including a notification of the determined benefit amount; and if a digital signal is received including an instruction from the annuitant to commence payment of the benefit amount in accordance with the benefit increase rate, providing an output digital signal including an instruction for paying the annuitant the determined benefit amount as a stream of payments increasing in accordance with the determined benefit increase rate.

BRIEF DESCRIPTION OF THE DRAWINGS

FIG. 5 is an exemplary display screen for providing queries as to absolute expense amounts in an implementation of a method of determining at least one feature of an annuity.

FIG. 6 is an exemplary display screen for providing queries as to relative expense amounts in an implementation of a method of determining at least one feature of an annuity.

FIGS. 10A-10D are exemplary illustrations of methods in accordance with embodiments of the invention.

FIGS. 11A, 11B and 11C are respectively a chart and tables displaying comparative illustrations of results using a prior art method and results employing a method in accordance with an embodiment of the invention.

DETAILED DESCRIPTION

It is to be understood that the figures and descriptions of the present invention have been simplified to illustrate elements that are relevant for a clear understanding of the present invention, while eliminating, for the purpose of clarity, many other elements found in typical computer systems, methods for administering questionnaires, and methods for administration of insurance products such as annuities. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein.

Figure 1:
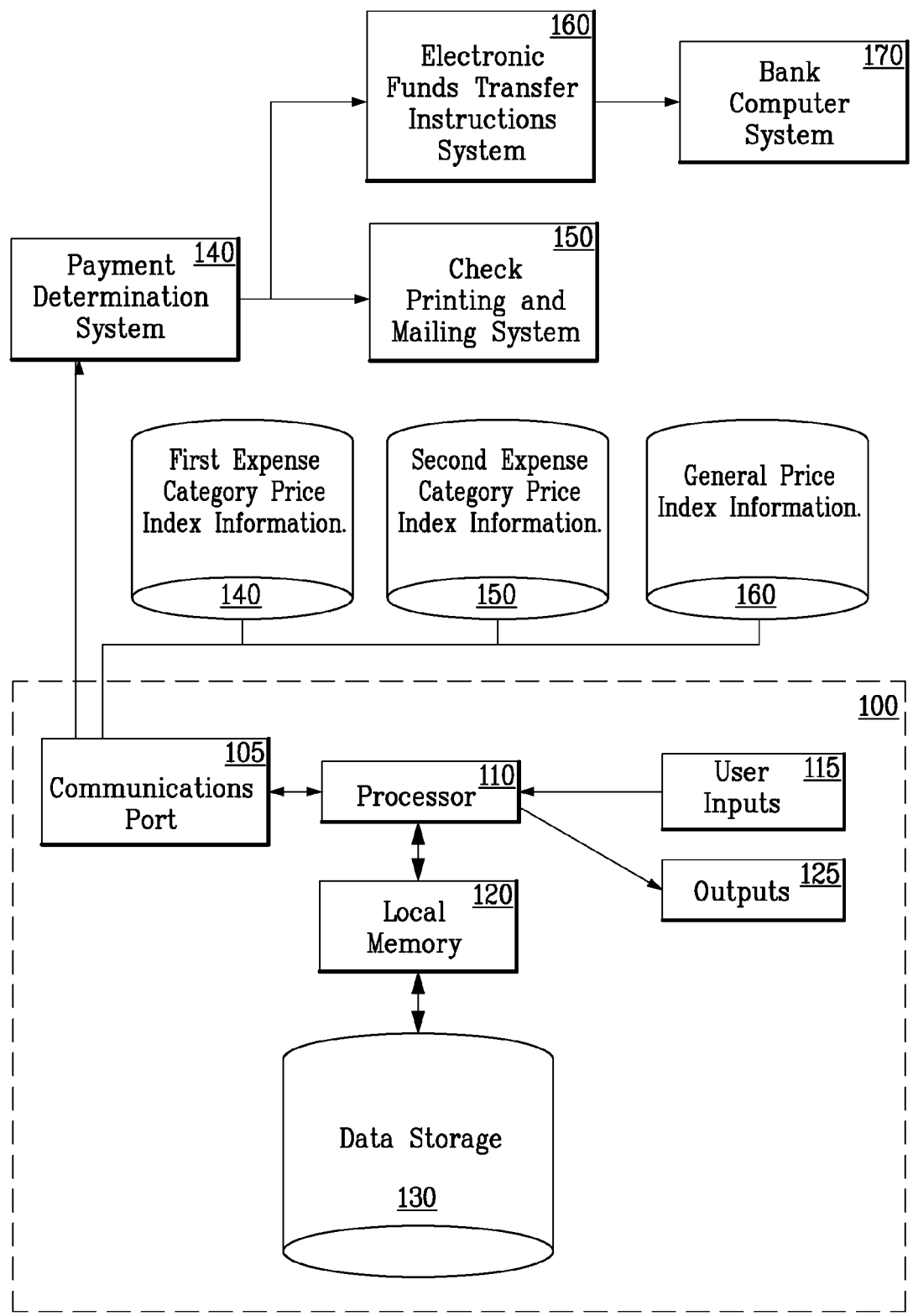
FIG. 1 is a schematic diagram of an exemplary computer system for implementation of a method and system of the invention.

Referring to FIG. 1, an exemplary computer system for use in the implementation of the invention will now be described. In computer system 100, processor 110 executes instructions contained in programs stored on recorded media. Processor 110 communicates, such as through suitable buses and other data channels, with communications port 105 and local memory 110, receives data from user inputs 115, and provides data to outputs 125. Local memory 120 is configured to exchange data with processor 110, and may store programs containing processor-executable instructions, and values of variables for use by such programs. Data storage 130 may include a wide variety of data acquired and processed in accordance with the invention. User input may be provided at inputs 115, which may include keyboards, mice and touchscreens. Outputs 125 may include displays and printers. Communications port 105 communicates with remote sources of information. Communication may be by one or more of suitable communication methods, including over wired or wireless local area networks and wide area networks, and over communications between networks, including over the Internet. Any suitable data and communication protocols may be employed. In the example of FIG. 1, remote sources of information include first expense category price index information 140, second expense category price index information 150, and general price index information 160. In an implementation of the invention, such information may be stored locally, such as in data storage 130.

Communications port 105 may communicate with payment determination system 140. Payment determination system 140 may include one or more computer systems, including processors, memory devices, user inputs, outputs, software executed by the processors, and other conventional components. Payment determination system 140 may be adapted to receive an output signal via communications port 105, which output signal includes payment information, such as an amount, a date payable, and information identifying an annuitant. Payment determination system 140 may further be adapted to determine a payor account and a payment method. The payor account may be an account with a selected bank; by way of example, payment determination system 140 may include a look-up table mapping annuitant information, such as geographic information, to a particular bank and account. Payment determination system 140 may also include stored in memory and accessible by a processor information indicating whether a particular annuitant is to be paid by paper check, by electronic funds transfer, or in some other manner. A processor of payment determination system 140 may cause to be stored in memory of the payment determination system the determined payor account information and the determined payment method. The processor of payment determination system 140 may cause a digital signal to be output indicative of the stored payor account information, the stored payment method, amount information and payee information.

In an embodiment, the output digital signal may be received by check printing and mailing system 150. Check printing and mailing system 150 may include one or more computer systems, including processors, memory devices, user inputs, outputs, software executed by the processors, and other conventional components. The outputs include in particular one or more printers, and may include other devices useful in printing and mailing paper checks, such as devices for feeding paper, separating printed checks, inserting printed checks into envelopes, sealing envelopes, and applying postage to envelopes as appropriate. The printed check is then mailed to the annuitant. The annuitant deposits the check in the annuitant's bank account, causing funds to be credited to the annuitant's bank account, and causing the funds to be withdrawn from the designated bank account from which the payment is made.

In an embodiment, the output digital signal from payment determination system 140 may be received by electronic funds transfer instructions system 160. Electronic funds transfer instructions system 160 may include one or more computer systems, including processors, memory devices, user inputs, outputs, software executed by the processors, and other conventional components. Electronic funds transfer instructions system 160 includes a processor adapted to provide an output signal indicative of an instruction to a bank determined by the payor account information to provide an electronic funds transfer from the payor account to a payee account in an amount as previously determined, such as by processor 110.

The output signal from electronic funds transfer instructions system 160 may be provided to a bank computer system 170, which carries out an electronic funds transfer, debiting the designated account, and resulting in a credit to a designated annuitant account.

A challenge that has been recognized by the inventors is that of matching changes in annuity payments to changes in the personal expenses of an annuitant over time. As noted, in the prior art, changes in annuity amounts have been fixed to an index associated with consumer prices. The index may be an index created by a government agency, such as the U.S. Department of Labor in the United States, for the CPI-U. Such a consumer price index represents a diverse basket of goods and services, with weightings for different items within the basket of goods and services. Such a price index will be referred to herein as a general consumer price index or a general price index. The inventors have recognized that a general price index may not accurately reflect changes in prices of goods and services purchased by an individual consumer, such as an individual annuitant. For example, an individual annuitant may spend a higher proportion of personal expenses on a particular category of goods and services that experiences price increases greater or less than reflected by an index. For example, an annuitant may be an older person and retired. Such persons have different personal expenses than those reflected by a general price index. For example, retired persons may spend a higher proportion of total personal expenses on travel than is reflected by a general price index. By way of further example, retired persons may spend a lower proportion of total personal expenses on housing, as retired persons are more likely to own their own homes and no longer have mortgage obligations.

The inventors have also observed that the mismatch between the basket of goods and services represented in a general price index and the goods and services actually purchased by an annuitant may change over time. By way of example, during an early period of retirement, an annuitant may spend a higher proportion of personal expenses on travel than the proportion of travel expenses in the basket reflected in the general price index. During a later period of retirement, the same annuitant may cease to travel, and have expenditures more similar to those reflected in the basket of goods and services reflected in the general price index.

Figure 2:
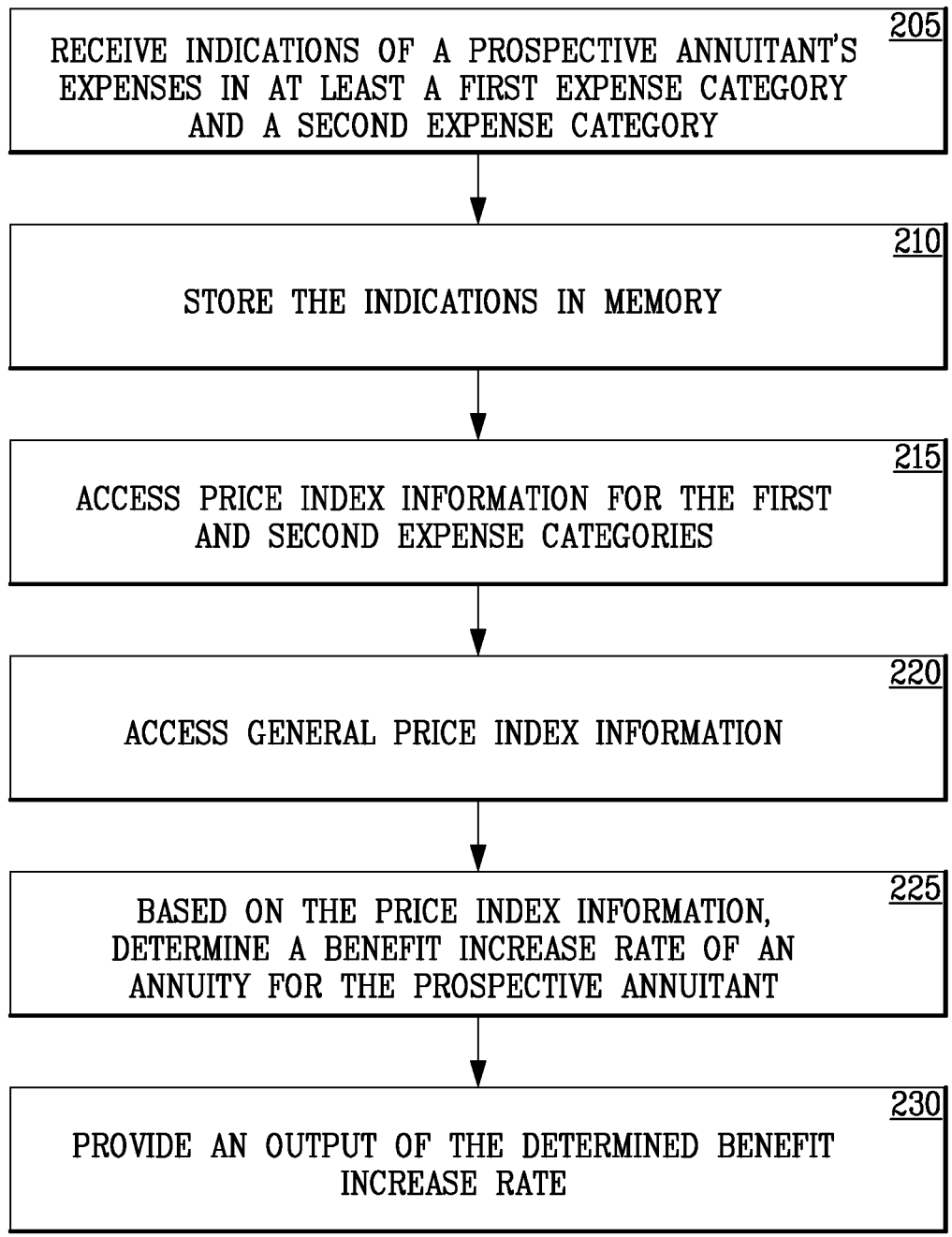
FIG. 2 is a process flow diagram illustrating a method for use in connection with an annuity.

Referring now to FIG. 2, a method in accordance with an embodiment of the invention will now be described. This method may be implemented by a computer system, such as the computer system illustrated in FIG. 1. In a first step of the method, data indicative of a prospective annuitant's personal expenses in at least a first expense category and in a second expense category may be received 205. Personal expenses include costs and expenses associated with the annuity. The data may be received by a processor 110 from a user-accessible device, such as user input 115. The received data may be stored 210 in memory, such as local memory 120. Price index information for at least the first and second expense categories may be accessed 215. By way of example, price index information for at least the first and second expense categories may be digitally stored in data storage locations 140, 150, and accessed by processor 110 via a digital communication channel, such as via communications port 105. General price index information may be accessed 220. General price index information may also be digitally stored in data storage 160 and may be accessed by processor 110 via a digital communication channel, such as communications port 105.

Based on the price index information for at least the first and second expense categories and general price index information, an estimated inflation rate applicable to the annuitant may be calculated 225, such as by processor 110. The estimated inflation rate applicable to an annuity may be stored in memory, such as local memory 120 and data storage 130. Processor 110 may provide an output digital signal to including the estimated inflation rate to outputs 125. Outputs 125 may include local or remote displays, printers, speakers, and communications devices.

Figure 3:
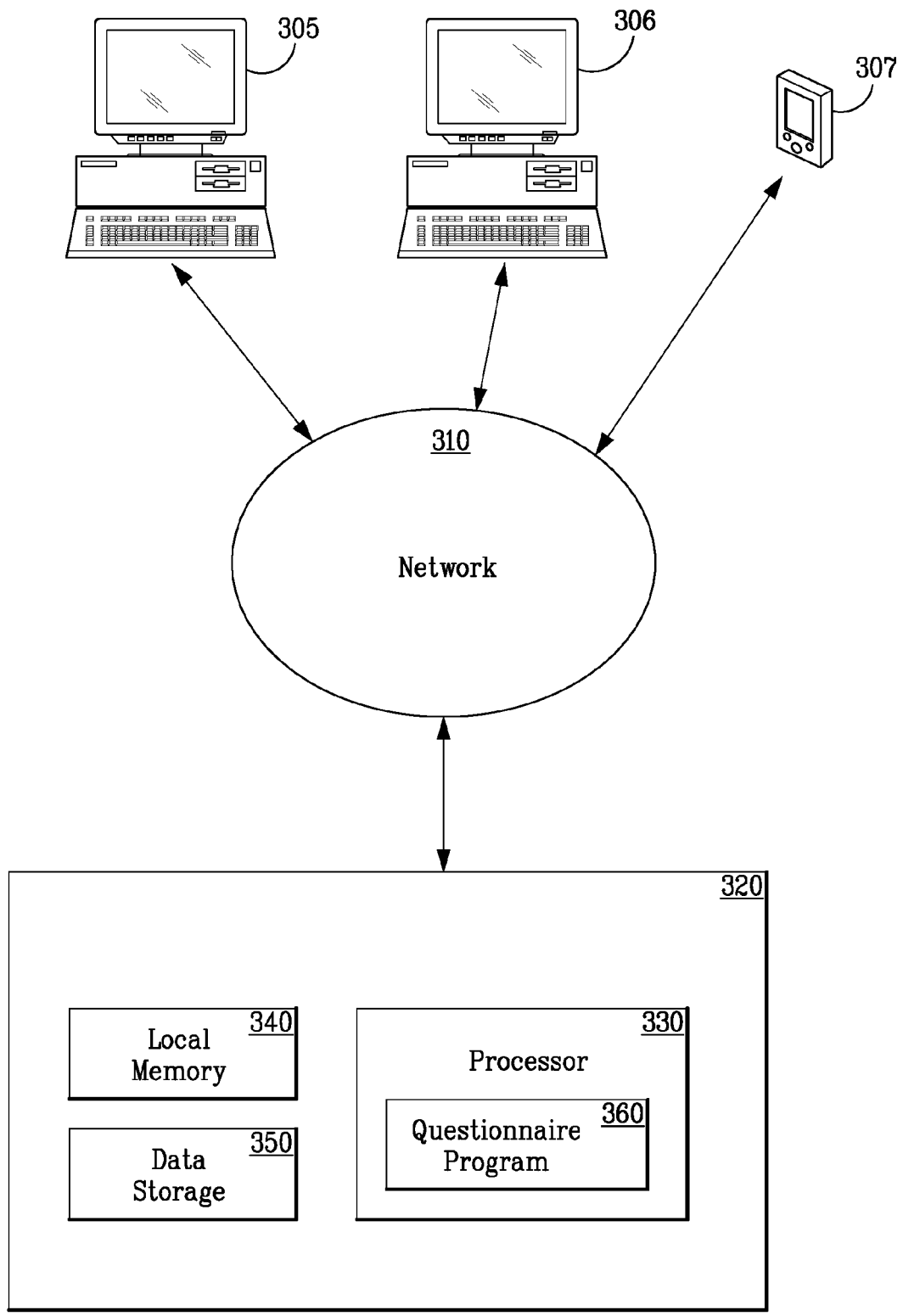
FIG. 3 is a schematic diagram of an arrangement of client computers and a server computer for implementation of a method and system of the invention.

FIG. 3 is a schematic diagram of a client server arrangement for implementation of a method and system in accordance with an embodiment of the invention. In the arrangement of FIG. 3, client devices 305, 306, 307 may be connected via network 310 to server 320. In an implementation, client devices 305, 306, 307 may be personal computers running an operating system such as Windows XP, Windows Vista, or Apple Tiger, thin client devices, portable devices such as personal digital assistants (running the Palm OS, by way of example), cell phones, or other devices. Network 310 may be or include the Internet, a corporate intranet, wireless and wired communications channels, and other network features. Server 320 may include processor 330 having local memory 340 and data storage 350. Questionnaire program 360 runs on processor 330. Questionnaire program 360 may initiate sessions with one more of client devices 305, 306, 307. Questionnaire program 360 may provide queries, and collect data relating to actual and anticipated expenses in at least first and second expense categories. Questionnaire program 360 may be, by way of example only, a Java-based program.

Figure 4:
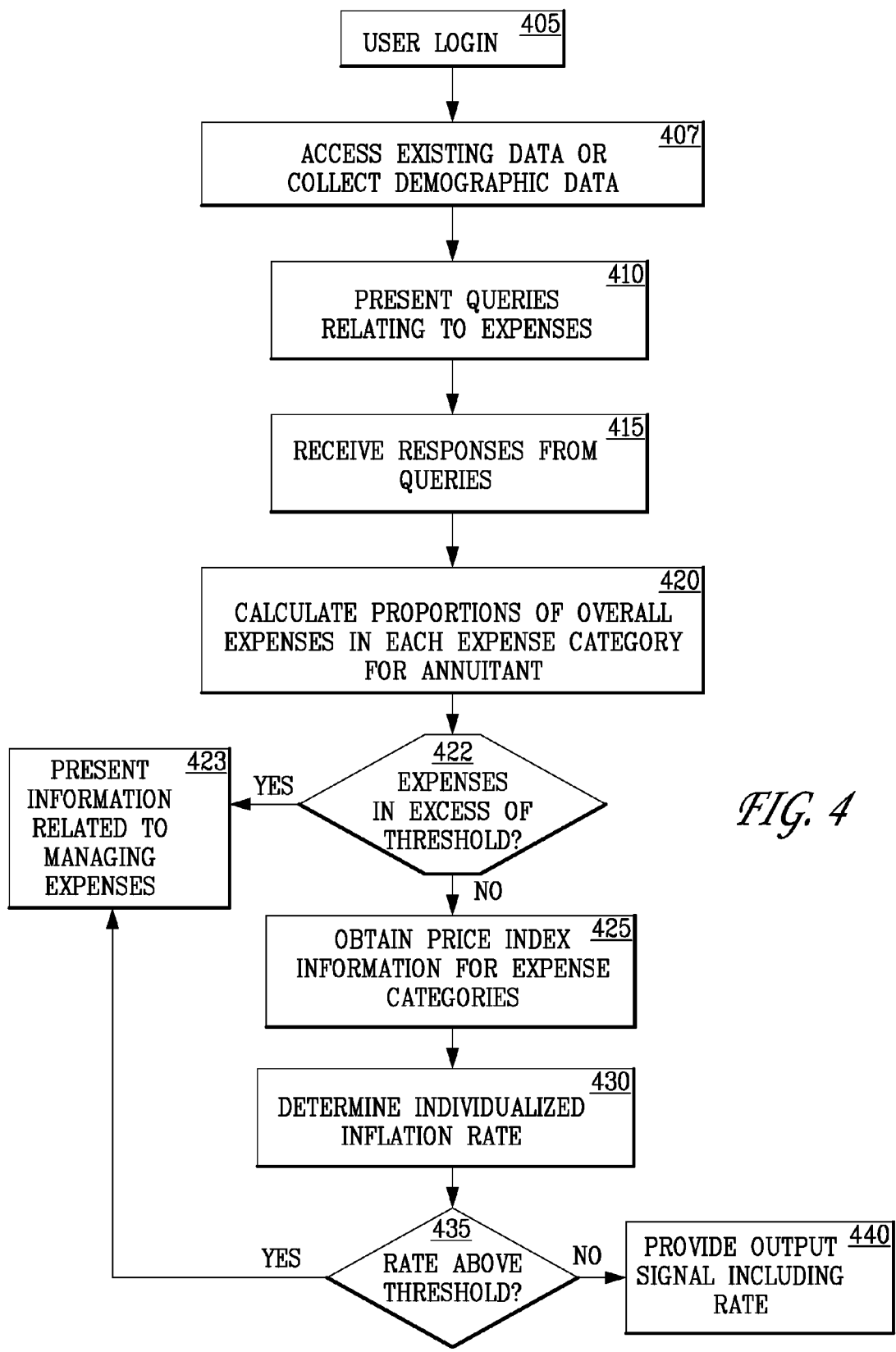
FIG. 4 is a process flow diagram illustrating a method for use in connection with an annuity.

Referring to FIG. 4, a process flow of an implementation will be described. A user, employing one of client devices 305, 306, 307 of FIG. 3, may login 405, using existing account information or creating a new account. A user may be an individual who is considering funding an annuity, or an advisor of a person or entity considering funding an annuity. The user may be the prospective annuitant, a relative of the prospective annuitant, an insurance broker or other financial advisor to a prospective annuitant, all by way of example. The questionnaire program or another program may access existing demographic information, or may present a questionnaire to collect demographic information 407.

In an implementation, questionnaire program 360 presents queries to the user relating to personal expenses of the user in at least a first expense category and a second expense category 410. In an embodiment, the queries may relate directly to personal expenses in the first and second categories. In an embodiment, the queries may directly inquire of the user to provide data indicative of the absolute level of personal expenses of the annuitant in one or more expense categories. In an embodiment, a single screen may present queries relating to a variety of personal expenses. An exemplary screen 500 is provided in FIG. 5. Screen 500 presents a series of expense categories 510, with an associated block 515 for entry of a numerical amount indicating an expense amount. In an implementation, the question is "How much do you spend monthly in each of the following categories?" The listed categories are health care 520, entertainment 525, housing 530, transportation 535, travel 540, food 545, utilities 550, clothing 555, and charitable contributions 560. These expense categories are merely exemplary.

After the user inputs the information, the client transmits the information to the server, which then stores the information.

In the implementation associated with the screen display 500, absolute expense values of personal expenses of an annuitant are obtained from a user. In other implementations, relative expense values may be queried. In one implementation, the user may be asked whether the annuitant spends more or less money than a typical person of similar age and circumstances in the same category. As noted above, demographic information about the annuitant may already be available. For example, the annuitant may already have a customer relationship with an insurance services provider. As a result of such demographic information, the insurance services provider may already have information such as the annuitant's age, marital status, age of spouse, current or prior profession, place of residence, income, assets, number and ages of children and their marital status, professions and incomes, and number and ages of grandchildren. Also as noted above, if this information is not already available, the information may be obtained, such as by presenting appropriate queries on a screen.

Referring now to FIG. 6, display screen 600 presents the same expense categories as in FIG. 5. In the embodiment of FIG. 6, display screen 600 includes a general question 610 relating to relative spending in the expense categories 615. The general question may inquire how the annuitant's spending in each expense category compares to the spending in the same expense category for a person of generally the same age and income. The mode of response may vary. In the illustrated embodiment, a slider 620 is associated with each expense category. The user may use a pointing device to move the slider either to the right to indicate more spending than typical, or to the left to indicate less spending than typical. However, the user may provide a number within a range, with the middle of the range being the same as typical, by way of example.

Figure 7:
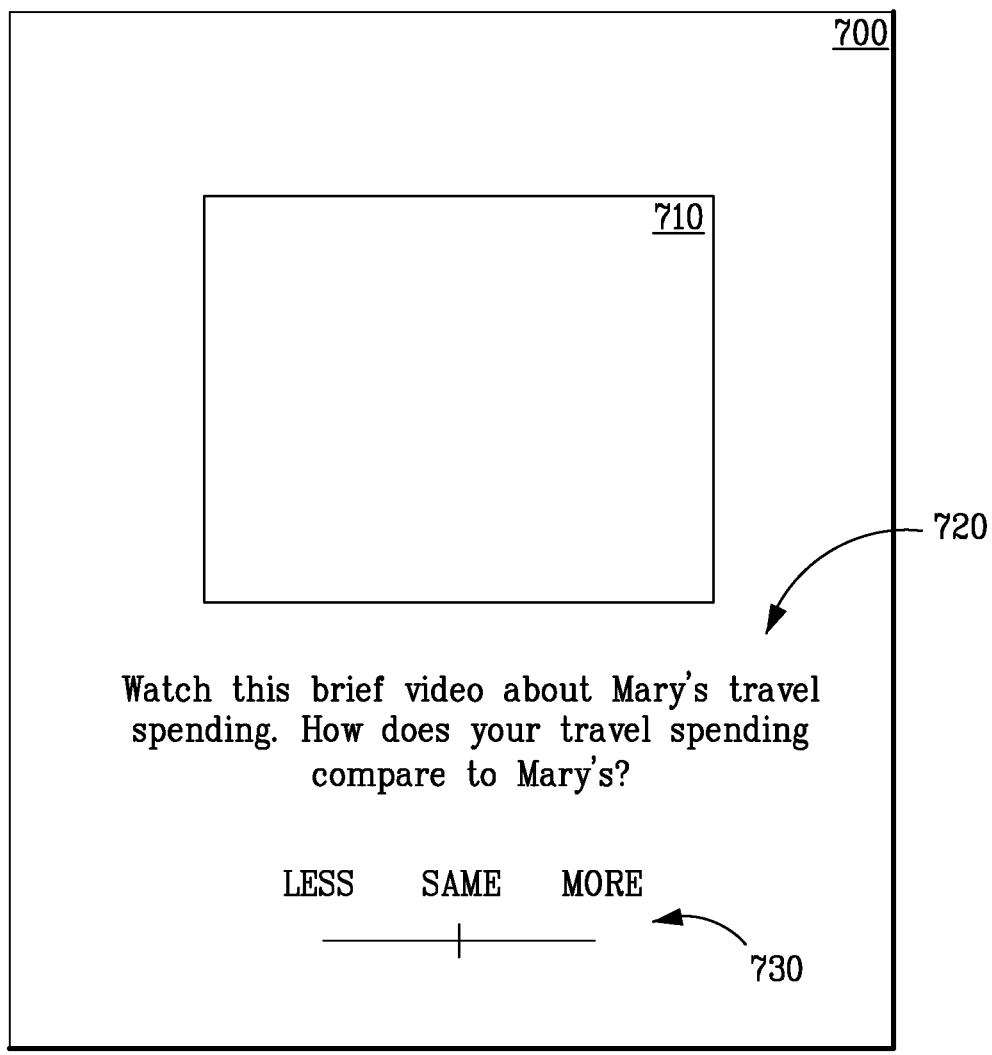
FIG. 7 is an exemplary display screen for providing a query associated with a video in an implementation of a method of determining at least one feature of an annuity.

In another embodiment, an example of a typical comparable person may be presented. Such an example may be presented in text, audio, or an audiovisual sequence prior to each question. By way of example, a video may be presented, portraying an individual, generally describing aspects of their life related to a certain expense category. For example, for the expense category of health related expenses, a person may be described as having a certain number of doctor visits per year, and a certain number of prescription medications. For the expense category of travel, the person could be described as traveling for a certain number of weeks each year, to a level of destination, e.g., luxury or budget accommodations, and to a distance of destination, e.g., regional, other region in the U.S., outside the U.S. Referring to FIG. 7, display 700 includes an area for display of a video 710, a relative question 720, and a slider for providing a response 730. Video 710 may present an exemplary person's activities.

In an implementation, indirect questions about personal expenses may be presented. For example, in order to obtain information about health, the question: How healthy do you feel? May be asked. If the response received indicates that the person feels relatively healthy, then expenses in the health category are likely to be less. If the response indicates that the person feels in relatively poor health, then expenses in the health category are likely to be greater. For example, in order to obtain information about travel, the question may be asked: Do you feel that travel is an important part of your life? If the response indicates that the person feels that travel is relatively unimportant, then expenses in the travel category are likely to be lower than average or typical. If the response indicates that the person feels that travel is very important, then expenses in the travel category are likely to be high than is average or typical.

Referring again to FIG. 4, the responses, whether relative or absolute, for each expense category, are transmitted by the client to the server, received at the server 415, and stored in memory. Based on the responses, approximate proportions of each expense category in the overall personal expenses of the annuitant may be calculated 420, such as by the processor. For example, based on absolute responses, an exemplary expense budget for the annuitant may be calculated. Based on relative personal expenses, an approximate share of the personal expenses of the annuitant for each expense category may be determined.

In an implementation, the processor may compare calculated factors or received data to one or more thresholds 422. Depending on the result of the comparison, the processor may access and cause to be displayed 423 information related to management of expenses in one or more categories. For example, if the received information or calculated factors show that spending in a particular category, such as health care costs, or a subcomponent of health care costs, such as prescription drugs, is above a threshold, then the processor may access and display information relating to managing costs in that category, such as prescription drugs. For example, the displayed information may provide information regarding availability of generic alternatives to branded pharmaceuticals, information regarding pharmacies that have certain pharmaceuticals available at lower costs, or insurance plans that provide applicable coverage. In an implementation, a referral to a third party service provider, such as a financial adviser, or other consultant, may be provided.

In an implementation, if the processor determines that expenses in a category are above a threshold, the processor may access and display information advising that the user reduce expenses in that category. For example, in a discretionary category, such as entertainment, the information may advise the user to reduce use of entertainment services. The information may also provide referrals to third party services, such as providers of discounted tickets to concerts, theater, and the like.

If the expenses are not above a threshold, digitally stored price index information for each category may then be accessed 425. Accessed price index information may also include general price index information. Based on the information and the relative personal expenses, an estimated inflation rate particularized to the annuitant is determined 430. The estimated inflation rate may be compared to a threshold 435. If the estimated rate exceeds a threshold, the processor may access and cause to be displayed 423 information related to management of expenses in one or more categories. In an implementation, thresholds for expense amounts, percentages or inflation rates may be predetermined and stored in memory. In an implementation, thresholds may be determined by the processor based on stored information. For example, a desired benefit increase rate may be determined based on historical performance of applicable price indices, and then determined to exceed a threshold increase rate available, based on applicable fees, available premium, desired income, and underwriting assumptions. In that event, the processor may access from memory and cause to be displayed information advising the user to reduce expenses in general and/or to reduce expenses in a particular category. In another example, a memory may include data as to typical expenses for individuals, which may include demographic information as well. The processor may access this memory, compare the demographic information stored in memory as to a user, and provide a response to the user based on the demographic information. For example, an algorithm may be provided to cause information to be displayed if the user is spending more money in a certain category than a particular percentage, such as 80%, of the individuals in an applicable demographic group, e.g., persons in the same age and income.

If the comparison of the estimated rate to a threshold indicates that the estimated inflation rate is below the threshold, then the processor may provide an output signal having data including the estimated inflation rate. The signal may be output to a user 440 for display on devices 305, 306, 307, for example.

Figure 8:
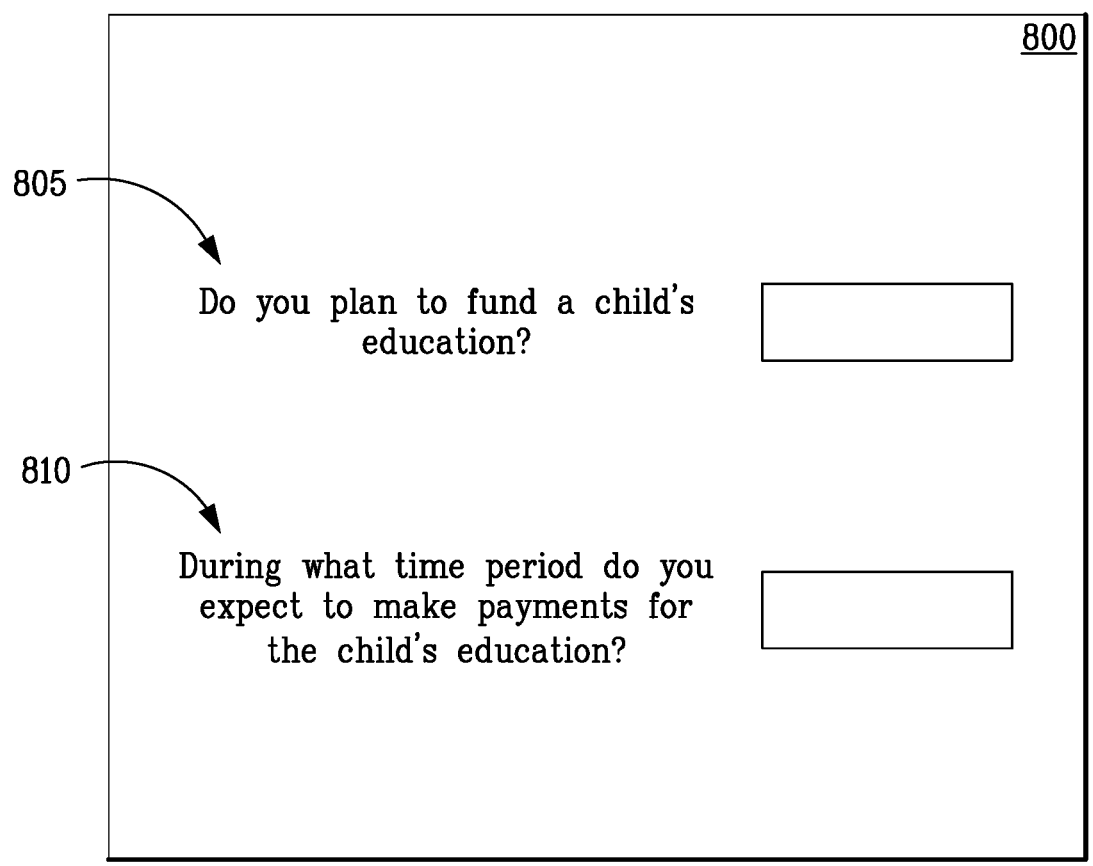
FIG. 8 is an exemplary display screen for providing a query associated with differing expense amounts in different time periods.

In an implementation, a query is provided as to anticipated personal expenses in at least one expense category during a first time period and during a second time period. The time periods may be during retirement. Examples of such time periods may include, for example, a first period of retirement, lasting for example from about 5 years to about 15 years, during which travel expenses are relatively high and medical expenses are relatively low. During a second period of retirement, as a result, for example, of additional health issues, travel expenses may relatively decline, and health expenses may relatively be greater than during the first period. By way of further example, funding of education for grandchildren or other school-age children may result in education expenses during a first time period, such as until the grandchildren have completed a certain degree level, such as completion of college. By way of example, referring to FIG. 8, a display screen 800 may include a query directed to ascertaining an approximate duration and personal expenses for a first time period. In an implementation, queries 805, 810 may inquire as to whether education expenses are to be funded, and through what time period.

Figure 9A:
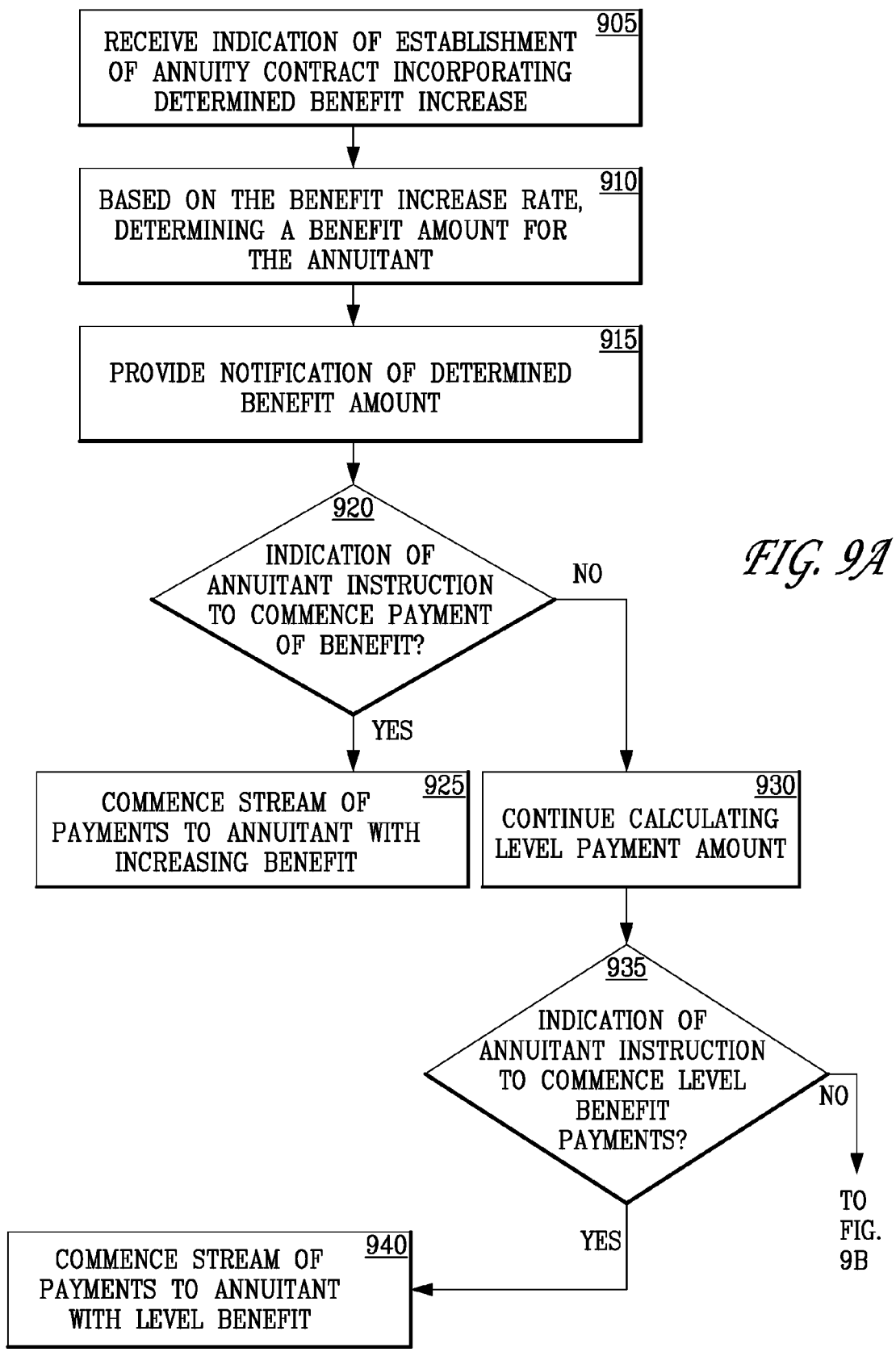
FIGS. 9A and 9B are a process flow diagram of a method of administering an annuity.
Figure 9B:
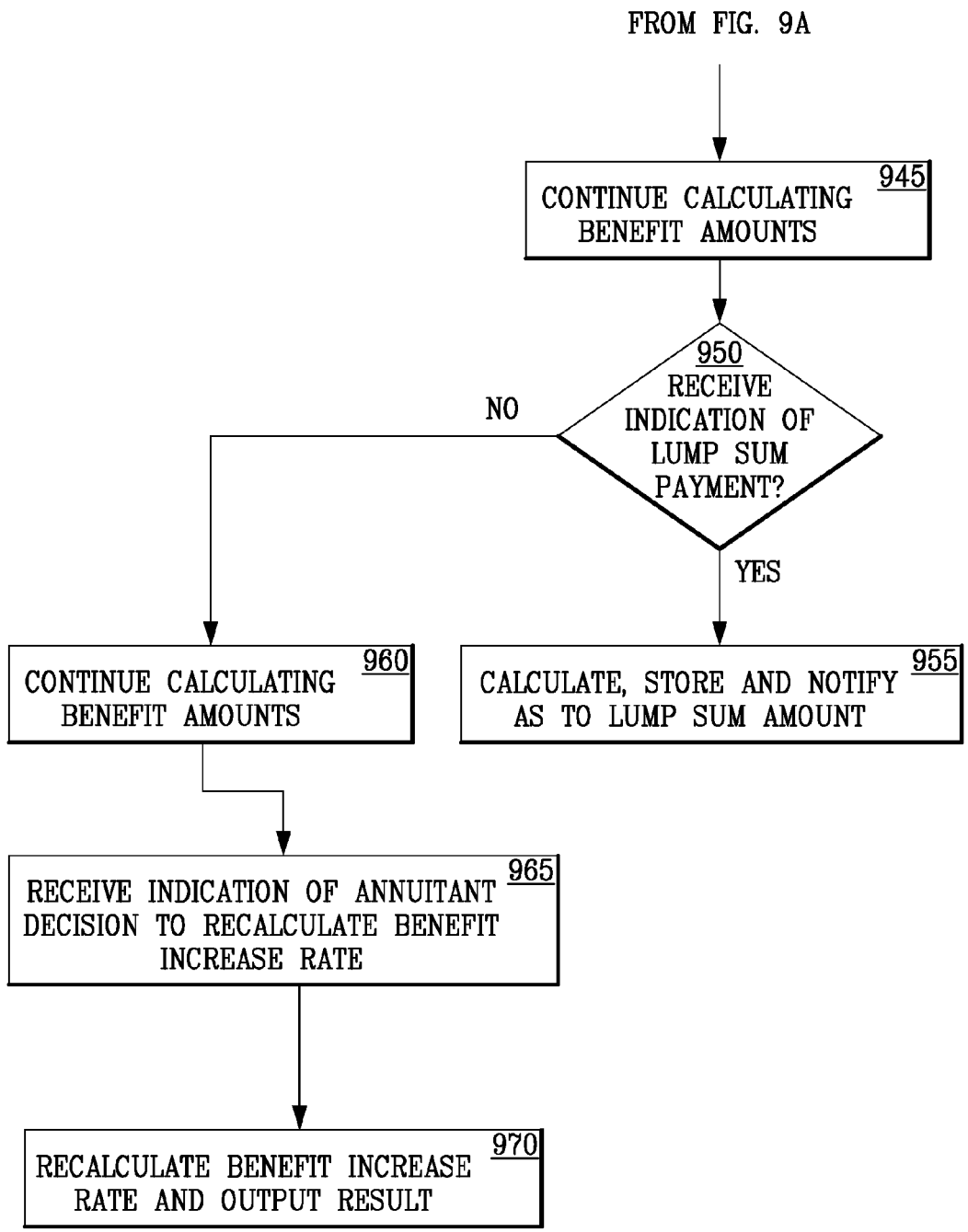

In an implementation, an annuity contract is administered. Referring to FIG. 9, a process flow will be described for contract administration. In the process flow of FIG. 9, a benefit increase amount has been determined in accordance with the process flow illustrated in FIG. 2. In FIG. 9, data indicative of establishment of an annuity contract is received 905. The annuity contract includes one or more features based on the determined benefit rate increase obtained in accordance with the process illustrated in FIG. 2 and described in the accompanying text. In accordance with the annuity contract, an initial asset value has been established, and the amount is stored in memory. The assets may be reflected as invested in one or more types of investments, as is known in the field of administration of annuities. An initial guaranteed minimum benefit payment, such as for the lifetime of the annuitant, may be calculated, stored in memory, and output. The initial amount may be based on a formula. The formula may be, for example, a specified percentage of an initial asset value. Subsequent payments may then be based on an increase, calculated periodically, such as annually, on the benefit amount. The amount of the subsequent payments may be calculated 910, stored, and output 915 to the annuitant.

An alternative may also be available under the annuity contract. Under the alternative, a level payment option is available. The level payment option may be based, for example, on a percentage of the asset value at the time that the level payment option instruction is received from the annuitant. Thus, the amount of the level payment option is dependent on investment returns associated with the annuity.

Under the annuity contract, the annuitant has an option to commence receiving payments calculated in accordance with the schedule. If an instruction from the annuitant is received, an indication may be received of the annuitant's instructions. The indication may be input manually through a user interface, for example. Upon receipt of an indication 920, a stream of payments is commenced 925. The stream of payments increases in accordance with the benefit rate increase as determined. The stream may be annual payments each in the same amount, for example, or payments at other periods, such as quarterly or monthly. If no indication is received, calculation of a level benefit amount continues 930.

In an implementation, in response to data indicative of an instruction from the annuitant to commence payment of a level benefit amount based on a percentage of an asset value associated with the annuity, the processor may cause a system to pay the annuitant a stream of payments of level amount, as indicated at 935 and 940. Otherwise, the system continues to calculate level payment amounts.

The annuity contract may provide an option for the annuitant to convert the right to a stream of payments of increasing amount to a lump sum. This option may be available on one or more dates, or during one or more time periods, or at any time. The lump sum payment may be calculated based on factors including applicable mortality rating, the length of a waiting period for the payment, the asset value in the corresponding account, and the calculated rate of benefit increase. In an implementation, in response to data indicative of an instruction from the annuitant to forgo an option of a stream of payments increasing in accordance with the determined benefit increase rate, a further single payment amount to be paid to the annuitant is calculated, stored in memory, and provided as an output, as indicated at 950 and 955. Otherwise, calculation of benefit payment amounts continues 960.

An annuity contract may provide an option for an annuitant to recalculate the increase rate. For example, the annuitant may have experienced changes in personal expenses in particular categories. The contract may provide limitations on the number of times or time periods of recalculation. The contract may provide a fee increase for the recalculation, for example. In an implementation, an instruction from the annuitant to recalculate is received. An indication is provided to a processor of the instruction 965. In response to the indication of an instruction from the annuitant to recalculate the determined benefit increase rate, substantially the steps described above with reference to FIG. 2 and accompanying text may be performed 970. For example, queries may be provided, and further data indicative of an annuitant's personal expenses in at least a first expense category and a second expense category may be received by the processor. The processor may access further price index information for the first expense category, for the second expense category; and further general price index information. The processor may based on the further price index information for the first expense category, the further price index information for the second expense category, and the further general price index information, determine a recalculated benefit increase rate of an annuity for the annuitant. The processor may calculate further benefit payment amounts based on the recalculated benefit increase rate.

In an implementation, an annuity contract may provide for a benefit increase rate based on a formula in which the price index information for at least a first expense category, the price index information for the second expense category, and the general price index information, are factors, but in which the benefit increase rate does not necessarily reflect the entire increase in the price index for the first expense category and the second expense category, and/or in the general price index. By way of example, the benefit increase rate may be capped. By way of further example, the effect on the benefit increase of the increase in the index in one or more expense categories may be capped. By way of further example, the effect on the benefit increase of the increase in one or more expense categories may be limited by a factor in the formula. For example, a benefit increase rate may be the sum of: 0.6 times a general index increase, 0.2 times the lesser of a health care price index increase and a cap, e.g., 5% per annum, and 0.2 times a travel price index increase, up to 5% per annum, with 0.1 times the travel price index increase over 5% per annum. In another implementation, the overall benefit increase rate may be subject to a cap. In an implementation, the applicable formula may be stored in memory, and a processor may access the formula and the index information in determining a benefit increase rate.

Referring now to FIGS. 10A to 10D, exemplary charts showing examples of a method and system of the invention are provided. Referring to FIG. 10A, a chart is shown based on an initial asset value of $100,000, and an initial age of 65 years. The benefit increase rate has been determined to be 4%. Returns are reinvested in the account, until the annuitant elects to start receiving payments. The annuitant may select either a level payment based on 5% of the then-current asset value, or the increasing payment. No increases in benefit amounts are available. An assumed annual rate of net return for the annuity is 7%. In this illustration, the annuitant receives a larger annuity based on level payments if the annuitant delays the commencement of payments sufficiently long. For example, if initial payments are delayed until age 80, then the level payment amount through age 90 is preferable to the increasing benefit. On the other hand, if the annuitant decides to commence benefit payments at age 70, then the increasing payments are greater than the level payments by age 74. Thus, the annuitant is protected against erosion of purchasing power, particularly if the annuitant elects to receive payments relatively soon.

Referring now to FIG. 10B, an example is shown that differs from the example of FIG. 10A in that the net returns for the annuity are 0%. The available level benefit premium is always $5,000, and thus is not shown. It will be appreciated that the benefit available is protected against purchasing power erosion associated with increases in the particular basket of products and services selected by the user.

Referring now to FIG. 10C, an example is shown in which the annuity account has an annual net return of 3%, and the determined benefit increase is 4%. A level benefit stream of payments is available, equal to 5% of the asset value of the account at the time of opting for the level benefit. As the level benefit is initially equal to the increasing benefit, and thereafter less than the increasing benefit, it is not shown. The payments begin at age 70. Under this scenario, the annuitant avoids the risk of declining purchasing power. In addition, if the annuitant survives to age 89, the payments continue to increase, notwithstanding the drop in asset value to zero. Advantageously, the annuitant is protected against outliving the annuitant's savings, as well as being protected against erosion in purchase power.

Referring now to FIG. 10D, an example is shown in which the annuity account has a net annual return of 5%. The benefit increase rate changes three times during the term. This rate change may be the result of recalculation, or may be the result of planned variation in the relative importance of different expense categories at different periods. Withdrawals begin at age 70. In this example, the level premium amount is greater than the amount based on an annual percentage increase from age 66 until age 72, after withdrawals have commenced.

FIGS. 11A, 11B, 11C and 11D, are respectively a chart and tables displaying comparative illustrations of results using a prior art method and results employing a method in accordance with an embodiment of the invention. In both methods, as noted in FIG. 11B with respect to the prior art method, and FIG. 11C with respect to the embodiment of the present invention, the illustration is for an annuitant at an age of 65 who purchases a single-premium immediate annuity with a premium of $100,000 and an initial asset value of $100,000. Both assume that the available income is 4% of the initial asset value. In both methods, the initial annual income is $4000. In the prior art example illustrated in FIG. 11B, and by line 1102 of FIG. 11A, the annual income amount increases annually by a general consumer price index, which is assumed for the purpose of the illustration to increase at 3% each year, as indicated by column 1118 of FIG. 11B. Thus, over the 20 years of the illustration, the annual income amount, indicated by line 1102, as well as columns 1120 and 1122 of FIG. 11B, rises to $7,014.

Figure 11A:
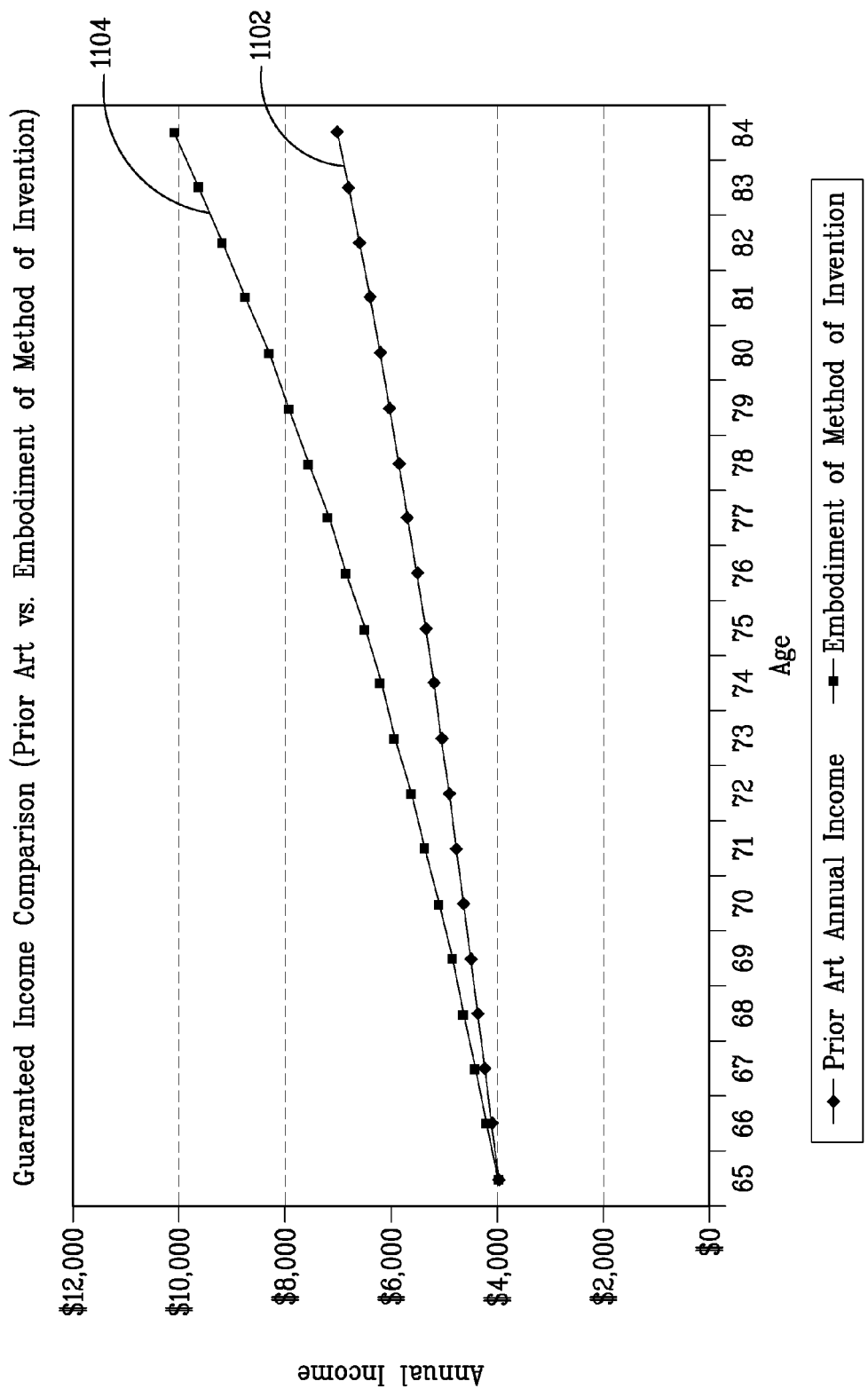

In the embodiment of the present invention illustrated by line 1104 of FIG. 11A, and by FIG. 11C, the annual income amount increases annually by an inflation rate determined in accordance with a method of the invention. In this example, as illustrated at column 1138 of FIG. 11C, the inflation rate is an annual rate of 5% for the first 19 years of the annuity, and then 3% in the last year of the illustration. In the method of the invention, the annual income provided to the annuitant is greater than the annual income under the prior art method, rising to $10,108 over 20 years, as shown in columns 1140 and 1142. This comparison may be seen graphically In FIG. 11A, where line 1102, representing the annual income in the prior art method, is less than line 1104, representing annual income in an embodiment of the method of the invention, by increasing amounts. The gap between the two, which rises to $3,094, represents the difference between the income in the prior art method, and the amount necessary to maintain the same purchasing power taking as determined by the method of the invention.

In FIG. 11B, a theoretical benefit base amount is set forth in the column labeled benefit base 1124. In FIG. 11C, a similar benefit base amount is set forth in the column labeled benefit base 1144. This benefit base amount indicates the asset value that would be required to provide the same annual income at the same rate. Thus, it can be seen that the income provided under the prior art would be the same as that provided by a benefit base rising to $175,351 at the end of 20 years, while the income provided under the method of an embodiment of the invention would be the same as that provided by a benefit base rising to $252,695.

While the illustration of FIGS. 11A, 11B and 11C illustrates the income benefits of an inflation rate higher than the rate provided by a general consumer price index, the method of the invention is advantageous in other circumstances. For example, if the determined inflation rate for personal expenses of the annuitant is less than the expected inflation rate, the cost to purchase the annuity or a rider to provide the inflation rate in accordance with a method of the invention will be less.

The present invention is operable with computer storage products or computer readable media that contain program code for causing a processor to perform the various computer-implemented operations. The computer-readable medium is any data storage device that can store data which can thereafter be read by a computer system such as a microprocessor. The media and program code may be those specially designed and constructed for the purposes of the present invention, or they may be of the kind well known to those of ordinary skill in the computer software arts. Examples of computer-readable media include, but are not limited to magnetic media such as hard disks, floppy disks, and magnetic tape; optical media such as CD-ROM disks; magneto-optical media; and specially configured hardware devices such as application-specific integrated circuits (ASICs), programmable logic devices (PLDs), and ROM and RAM devices. Examples of program code include both machine code, as produced, for example, by a compiler, or files containing higher-level code that may be executed using an interpreter. Steps in the computer-implemented methods may be implemented in processors running software stored locally, and/or in configurations such as application service providers, in which certain steps are executed on processors communicating with one another over a network such as the Internet. Either stand-alone computers or client/server systems, or any combination thereof, may be employed.

A system in accordance with the invention may include means corresponding to each step in any of the methods described in this application. Each of the means may be implemented by a processor, such as processor 110, executing instructions contained in programs which may be stored in a storage medium, such as local memory 120. It will be appreciated that any of the steps in the methods in accordance with the invention described herein may be so implemented.

It will be appreciated that advantages of a method and system in accordance with the present invention include accurate protection of an annuitant against price increases. It will be appreciated that a determined index may be employed by an annuitant, a financial advisor, or others, for other financial planning purposes.

In an implementation, an annuity contract with an increasing benefit may include various features relative to a level benefit. For example, a percentage fee may be higher. Alternatively or in addition, the investment mix may be more aggressive than otherwise.

While the foregoing invention has been described with reference to the above embodiments, various modifications and changes can be made without departing from the spirit of the invention. Accordingly, all such modifications and changes are considered to be within the scope of the appended claims.

What is claimed is:

1. A computer system for use in connection with preparation of an insurance contract, namely an annuity, comprising:
a processor; and
a memory in communication with the processor;
the processor configured to:
display queries on a user-accessible device;
receive data entered in response to said queries displayed via the user-accessible device indicative of the amounts of a prospective annuitant's personal expenses in at least a first expense category and a second expense category, the first and second expense categories being at least two of health care, entertainment, housing, transportation, travel, food and utilities;
access stored price index information for the first expense category and the second expense category;
access stored general consumer price index information;
based on factors including at least the personal expense amounts in the first and second expense categories, price index information for the first expense category, the price index information for the second expense category, and a value of the general consumer price index, determine a benefit increase rate of an annuity for the prospective annuitant; and
display the determined benefit increase rate, wherein the determined benefit increase rate reflects an inflation rate applicable to the prospective annuitant's personal expenses more accurately than does the general consumer price index.

2. The system of claim 1, wherein the processor is further configured to access and display information related to management of expenses if expenses in one of the first and second expense categories exceeds a threshold.

3. The computer system of claim 1, wherein the processor is further configured to present, via the user-accessible device in association with the queries, examples pertinent to personal expenses in at least the first and second expense categories.

4. A computer system for use in connection with an annuity, comprising:
a processor;
a memory in communication with the processor;
the processor configured to:
receive data indicative of a prospective annuitant's personal expenses in at least a first expense category and a second expense category;
store the data in the memory;
access digitally stored price index information for the first expense category;
access digitally stored price index information for the second expense category;
access digitally stored general consumer price index information; and
based on factors including at least the price index information for the first expense category, the price index information for the second expense category, and a value of the general consumer price index, determine a benefit increase rate of an annuity for the prospective annuitant; and provide an output digital signal indicative of at least the determined benefit increase rate.

5. The system of claim 4, further comprising an user-accessible device, the processor being configured to receive the data from the user-accessible device.

6. The system of claim 5, wherein the processor is further configured to prompt via the user-accessible device for absolute data indicative of a particular numerical value of personal expenses in at least the first expense category and the second expense category.

7. The system of claim 5, wherein the processor is further configured to, prior to receiving data, prompt via the user-accessible device for relative data indicative of a range of numerical values of personal expenses, said range determined relative to one or more predetermined parameter values, in at least the first expense category and the second expense category.

8. The system of claim 7, wherein the processor is further configured to, prior to prompting, present, via the user-accessible device, examples pertinent to personal expenses in at least the first and second expense categories, said examples characteristic of a personal expense profile baseline for comparison with the prompted information.

9. The system of claim 5, wherein the processor is further configured to prompt via the user-accessible device for data indicative of personal expenses in at least the first expense category during first and second future time periods.

10. The system of claim 4, wherein the processor is configured to receive the data from the memory.

11. The system of claim 4, wherein the first expense category comprises one of health care, entertainment, housing, transportation, travel, food, and utilities.

12. The system of claim 11, wherein the second expense category comprises another of health care, entertainment, housing, transportation, travel, food, and utilities.

13. The system of claim 4, wherein the general price index information includes a government published price index for consumers.

14. The system of claim 4, further comprising: a payment determination system having a processor for: receiving the output signal, determining of a payor account and a payment method; storing of the determined payor account information and the determined payment method in a memory of the payment determination system; outputting of a digital signal indicative of the stored payor account information, the stored payment method, amount information and payee information; and a payment fulfillment system for receiving the digital signal from the payment determination system and for fulfillment of payment in accordance with the information conveyed by the digital signal from the processor of the payment determination system.

15. The system of claim 14, wherein the payment fulfillment system is a check printing and mailing system for printing and mailing a check drawn on the payor account in an amount and to a payee as determined by the information conveyed by the digital signal from the processor of the payment determination system.

16. The system of claim 14, wherein the payment fulfillment system is a system for generating electronic funds transfer requests for providing of an instruction to a bank determined by the payor account information to provide an electronic funds transfer from the payor account to a payee account in an amount determined by the information conveyed by the digital signal from the processor of the payment determination system.

17. A computer implemented method for use in connection with an annuity, comprising:

receiving data indicative of a prospective annuitant's personal expenses in at least a first expense category and a second expense category;

storing the data in memory;

accessing via a processor price index information for the first expense category;

accessing via the processor price index information for the second expense category;

accessing via the processor general consumer price index information; and based on factors including the price index information for the first expense category, the price index information for the second expense category, and a value of the general consumer price index, determining in the processor a benefit increase rate of an annuity for the prospective annuitant; and providing an output including data indicative of at least the determined benefit increase rate.

18. The method of claim 17, wherein the step of receiving data comprises receiving data from a memory.

19. The method of claim 17, wherein the step of receiving data comprises receiving data from a user-accessible device.

20. The method of claim 19, further comprising, prior to said step of receiving data, prompting via the user-accessible device for absolute data indicative of a particular numerical value of personal expenses in at least the first expense category and the second expense category.

21. The method of claim 19, further comprising, prior to said step of receiving data, prompting via the user-accessible device for relative data indicative of a range of numerical values of personal expenses, said range determined relative to one or more predetermined parameter values, in at least the first expense category and the second expense category.

22. The method of claim 21, further comprising, prior to said step of prompting, presenting, via the user-accessible device, examples pertinent to personal expenses in at least the first and second expense categories, said examples characteristic of a personal expense profile baseline for comparison with the prompted information.

23. The method of claim 22, wherein the step of prompting comprises causing display of prompting information on a display of a client device, and wherein the step of receiving comprises receiving the data at a server associated with the client device.

24. The method of claim 19, further comprising prompting via the user-accessible device a prospective annuitant for data indicative of personal expenses in at least the first expense category during first and second future time periods.

25. The method of claim 24, wherein the first expense category comprises health-related expenses.

26. The method of claim 17, wherein the general price index information includes a government published price index for consumers.

27. A tangible computer-readable medium having a plurality of instructions thereon which, when executed by a processor, cause the processor to perform the steps of:

receiving data indicative of a prospective annuitant's personal expenses in at least a first expense category and a second expense category;

storing the data in memory;

accessing digitally stored price index information for the first expense category;

accessing digitally stored price index information for the second expense category;

accessing digitally stored general consumer price index information; and based on factors including at least the price index information for the first expense category, the price index information for the second expense category, and a value of the general consumer price index, determining a benefit increase rate of an annuity for the prospective annuitant; and providing an output digital signal indicative of at least the determined benefit increase rate.

28. The computer-readable medium of claim 27, wherein the instructions, when executed by a processor, cause the processor to perform the step of receiving data by receiving data from memory.

29. The computer-readable medium of claim 27, wherein the instructions, when executed by a processor, cause the processor to perform the step of receiving data by receiving data from a user-accessible device.

30. A system for administering an annuity, comprising:
a processor;
a memory in communication with the processor;
the processor configured to:
receive data indicative of an annuitant's personal expenses in at least a first expense category and a second expense category;
access digitally stored price index information for the first expense category;
access digitally stored price index information for the second expense category;
access digitally stored general consumer price index information; and
based on factors including the price index information for the first expense category, price index information for the second expense category, and a value of the general consumer price index, determine a benefit increase rate of an annuity for the annuitant;
receive a digital signal including an indication of an establishment of an annuity contract, wherein at least one feature of the annuity contract is the determined benefit increase rate;
based on the benefit increase rate, determine a benefit amount for the annuitant;
provide an output digital signal including a notification of the determined benefit amount; and
if a digital signal is received including an instruction received from the annuitant to commence payment of the benefit amount in accordance with the benefit increase rate, provide one or more output digital signals including an instruction to pay the annuitant the determined benefit amount as a stream of payments increasing in accordance with the determined benefit increase rate.

31. The system of claim 30, wherein, the processor is further configured to, in response to receipt of a digital signal including data indicative of an instruction from the annuitant to commence payment of a level benefit amount based on a percentage of an asset value associated with the annuity, provide one or more output signals including one or more instructions for paying the annuitant a stream of payments of level amount.

32. The system of claim 30, wherein the processor is configured to, in response to receipt of a digital signal including data indicative of an instruction from the annuitant to forgo an option of a stream of payments increasing in accordance with the determined benefit increase rate, calculate a further single payment amount to be paid to the annuitant, store the calculated amount in a memory device, and include the calculated amount in an output digital signal.

33. The system of claim 30, wherein, the processor is configured to, in response to receipt of a digital signal including data indicative of an instruction from the annuitant to recalculate the determined benefit increase rate:
receive via a user input further data indicative of an annuitant's personal expenses in at least a first expense category and a second expense category;
access further digitally stored price index information for the first expense category;
access further digitally stored price index information for the second expense category;
access further digitally stored general consumer price index information; and
based on the further price index information for the first expense category, the further price index information for the second expense category, and a value of the further general consumer price index, determine a recalculated benefit increase rate of an annuity for the annuitant;
calculate further benefit payment amounts based on the recalculated benefit increase rate; and
provide a digital output signal including the calculated further benefit payment amounts.

34. The system of claim 30, further comprising:
a payment determination system having a processor for: receiving the output signal including an instruction to pay, determining of a payor account and a payment method; storing of the determined payor account information and the determined payment method in a memory of the payment determination system; outputting of a digital signal indicative of the stored payor account information, the stored payment method, amount information and payee information; and
a payment fulfillment system for receiving the digital signal from the payment determination system and for fulfillment of payment in accordance with the information conveyed by the digital signal from the processor of the payment determination system.

35. A computer-implemented method of administering an annuity contract, comprising the steps of:
receiving from a user interface device data indicative of an annuitant's personal expenses in at least a first expense category and a second expense category;
accessing by a processor via a digital communication channel digitally stored price index information for the first expense category;
accessing by the processor via a digital communication channel digitally stored price index information for the second expense category;
accessing by the processor via a digital communication channel, digitally stored general consumer price index information; and
based on factors including at least the price index information for the first expense category, price index information for the second expense category, and a value of the general consumer price index, determining by the processor a benefit increase rate of an annuity for the annuitant;
receiving at the processor a digital signal including data indicative of an establishment of an annuity contract, wherein at least one feature of the annuity contract is the determined benefit increase rate;
based on the benefit increase rate, determining by the processor a benefit amount for the annuitant;

providing by the processor an output signal including a notification of the determined benefit amount; and if a digital signal is received by the processor including an instruction from the annuitant to commence payment of the benefit amount in accordance with the benefit increase rate, providing an output digital signal including an instruction for paying the annuitant the determined benefit amount as a stream of payments increasing in accordance with the determined benefit increase rate.

36. The method of claim 35, wherein, in response to receipt by the processor of a digital signal including data indicative of an instruction from the annuitant to commence payment of a level benefit amount based on a percentage of an asset value associated with the annuity, providing from the processor one or more output signals including one or more instructions for paying the annuitant a stream of payments of level amount.

37. The method of claim 35, wherein, in response to receipt by the processor of a digital signal including data indicative of an instruction from the annuitant to forgo an option of a stream of payments increasing in accordance with the determined benefit increase rate, a further single payment amount to be paid to the annuitant is calculated by the processor, stored in a memory device, and included in an output digital signal provided by the processor.

38. The method of claim 35, wherein, in response to receipt by the processor of a digital signal including data indicative of an instruction from the annuitant to recalculate the determined benefit increase rate, the following steps are performed:

receiving at the processor further data indicative of an annuitant's personal expenses in at least a first expense category and a second expense category;

accessing by the processor further digitally stored price index information for the first expense category;

accessing by the processor further digitally stored price index information for the second expense category;

accessing by the processor further digitally stored general consumer price index information; and based on the further price index information for the first expense category, further price index information for the second expense category, and a value of the further general consumer price index, determining by the processor a recalculated benefit increase rate of an annuity for the annuitant;

calculating by the processor further benefit payment amounts based on the recalculated benefit increase rate; and providing by the processor a digital output signal including the calculated further benefit payment amounts.

39. The method of claim 35, further comprising receiving by a payment determination system having a processor the output signal including an instruction for paying, determining of a payor account and a payment method; storing of the determined payor account information and the determined payment method in a memory of the payment determination system; outputting of a digital signal indicative of the stored payor account information, the stored payment method, amount information and payee information; and receiving at a payment fulfillment system the digital signal from the payment determination system and fulfilling payment in accordance with the information conveyed by the digital signal from the processor of the payment determination system.

40. The method of claim 35, wherein the data indicative of an annuitant's personal expenses is received from memory.

41. The method of claim 35, wherein the data indicative of an annuitant's personal expenses is received from a user-accessible device.

42. A tangible computer-readable medium having a plurality of instructions thereon which, when executed by a processor, cause the processor to perform the steps of:

receiving data indicative of an annuitant's personal expenses in at least a first expense category and a second expense category;

accessing digitally stored price index information for the first expense category;

accessing digitally stored price index information for the second expense category;

accessing digitally stored general price index information; and based on factors including at least the price index information for the first expense category, the price index information for the second expense category, and a value of the general consumer price index, determining a benefit increase rate of an annuity for the annuitant;

receiving a digital signal including data indicative of an establishment of an annuity contract, wherein at least one feature of the annuity contract is the determined benefit increase rate;

based on the benefit increase rate, determining a benefit amount for the annuitant;

providing an output digital signal including a notification of the determined benefit amount; and if a digital signal is received including an instruction from the annuitant to commence payment of the benefit amount in accordance with the benefit increase rate, providing an output digital signal including an instruction for paying the annuitant the determined benefit amount as a stream of payments increasing in accordance with the determined benefit increase rate.

43. The computer-readable medium of claim 42, wherein the instructions further cause the processor to receive the data from a user-accessible device.

44. The computer-readable medium of claim 43, wherein the instructions further cause the processor to prompt via the user-accessible device for absolute data indicative of a particular numerical value of personal expenses in at least the first expense category and the second expense category.

45. The computer-readable medium of claim 43, wherein the instructions further cause the processor to, prior to receiving data, prompt via the user-accessible device for relative data indicative of a range of numerical values of personal expenses, said range determined relative to one or more predetermined parameter values, in at least the first expense category and the second expense category.

46. The system of claim 8, wherein said examples pertinent to personal expenses in at least the first and second expense categories characteristic of a personal expense profile baseline for comparison with the prompted information include: at least one of audio, text, and video sequences depicting aspects of a person's lifestyle relating to said first and second expense categories.

47. The method of claim 22, wherein said presenting, via the user-accessible device, examples pertinent to personal expenses in at least the first and second expense categories characteristic of a personal expense profile baseline for comparison with the prompted information includes displaying on said user accessible device at least one of audio, text, and video sequences depicting aspects of a person's lifestyle relating to said first and second expense categories.

48. The system of claim 5, wherein the processor is further configured to cause display of prompting information on a display of the user-accessible device, and receive the data at a server associated with the user-accessible device.

49. The method of claim 25, wherein the second expense category comprises clothing.

* * * * *